US008485476B2

(12) United States Patent
Zha et al.

(10) Patent No.: US 8,485,476 B2
(45) Date of Patent: Jul. 16, 2013

(54) DISCRETE CO-FLOW JET (DCFJ) AIRFOIL

(75) Inventors: Gecheng Zha, Miami, FL (US); Bertrand P. E. Dano, Miami, FL (US)

(73) Assignee: University of Miami, Miami, FL (US)

( * ) Notice: Subject to any disclaimer, the term of this patent is extended or adjusted under 35 U.S.C. 154(b) by 472 days.

(21) Appl. No.: 13/102,844

(22) Filed: May 6, 2011

(65) Prior Publication Data

US 2011/0210211 A1 Sep. 1, 2011

Related U.S. Application Data

(63) Continuation-in-part of application No. 12/119,193, filed on May 12, 2008, now Pat. No. 8,262,031, which is a continuation-in-part of application No. PCT/US2007/010122, filed on Apr. 24, 2007, application No. 13/102,844, which is a continuation-in-part of application No. 11/064,053, filed on Feb. 23, 2005, now abandoned.

(60) Provisional application No. 60/796,042, filed on Apr. 28, 2006, provisional application No. 60/603,212, filed on Aug. 20, 2004.

(51) Int. Cl.
*B64C 21/04* (2006.01)
*B64C 21/06* (2006.01)
*B64C 39/10* (2006.01)

(52) U.S. Cl.
USPC ............................................. 244/208; 244/36

(58) Field of Classification Search
USPC ..................... 244/36, 207, 208, 209
See application file for complete search history.

(56) References Cited

U.S. PATENT DOCUMENTS

| | | | |
|---|---|---|---|
| 1,888,871 A | 11/1932 | Apperman | |
| 2,041,795 A | 5/1936 | Stalker | |
| 2,075,817 A | 4/1937 | Loerke | |
| 2,078,854 A | 4/1937 | Jones | |
| 2,514,513 A | 7/1950 | Price | |
| 2,734,701 A | 2/1956 | Horton | |
| 2,809,793 A | 10/1957 | Warner | |
| 2,941,751 A | 6/1960 | Gagarin | |
| 3,029,044 A | 4/1962 | Childress | |
| 3,261,576 A | 7/1966 | Valyi | |
| 3,576,300 A | 4/1971 | Palfreyman | |
| 4,033,526 A | 7/1977 | Benson | |
| 4,848,701 A | 7/1989 | Belloso | |
| 5,255,881 A | 10/1993 | Rao | |
| 5,335,885 A | 8/1994 | Bohning | |
| 5,687,934 A | 11/1997 | Owens | |
| 5,899,416 A | 5/1999 | Meister et al. | |
| 6,923,403 B1 | 8/2005 | Dizdarevic et al. | |
| 7,143,983 B2 | 12/2006 | McClure | |
| 7,878,458 B2 * | 2/2011 | Shmilovich et al. | 244/207 |

(Continued)

OTHER PUBLICATIONS

Anders, S., et al., "Active Flow Control Activities at NASA Langley", AIAA 2004-2623, Jun. 2004.

(Continued)

*Primary Examiner* — Joseph W Sanderson
(74) *Attorney, Agent, or Firm* — Christopher & Weisberg, P.A.

(57) ABSTRACT

The present invention provides an aircraft having one or more fixed wings in a flying wing configuration, where the aircraft further includes a high performance co-flow jet (CFJ) circulating about at least a portion of an aircraft surface to produce both lift and thrust.

19 Claims, 24 Drawing Sheets

U.S. PATENT DOCUMENTS

| | | | |
|---|---|---|---|
| 8,251,317 B2 * | 8/2012 | Pitt | 244/204 |
| 8,262,031 B2 * | 9/2012 | Zha et al. | 244/208 |
| 2009/0014592 A1 | 1/2009 | Zha | |
| 2009/0065631 A1 | 3/2009 | Zha | |
| 2009/0108141 A1 * | 4/2009 | Shmilovich et al. | 244/207 |

OTHER PUBLICATIONS

Tilmann, C.P., et al., "Flow Control Research and Applications at the AFRL's Air Vehicles Directorate", AIAA 2004-2622, Jun. 2004.

Miller, D., et al., "Aerodynamic Flowfield Control Technologies for Highly Integrated Airframe Propulsion Flowpaths", AIAA 2004-2625, Jun. 2004.

Kibens, V., et al., "An Overview of Active Flow control Applications at the Boeing Company", AIAA 2004-2624, Jun. 2004.

Englar, R.J., "Circulation Control Pneumatic Aerodynamics: Blown Force and Moment Augmentation and Modifications; Past, Present and Future", AIAA 2000-2541, Jun. 2000.

Bradley, L.C., "An Experimental Investigation of a Sting-Mounted Finite Circulation Control Wing", M.S. Thesis, Air Force Institute of Technology, Dec. 1995.

Wood, N., et al., "Control of Asymmetric Vortical Flows over Delta Wings at High Angles of Attack", Journal of Aircraft, vol. 27, No. 5, pp. 429-435, May 1990.

Wood, N., et al., "Control of Vortical Lift on Delta Wings by Tangential Leading-Edge Blowing", Journal of Aircraft, vol. 25, No. 3, pp. 236-243, Mar. 1988.

Wood, N., et al., "Circulation Control Airfoils Past, Present, Future", AIAA 85-0204, 1985.

Englar, R.J., et al., "STOL Potential of the Circulation Control Wing for High-Performance Aircraft," Journal of Aircraft, vol. 15, No. 3, pp. 175-181, Mar. 1978.

Englar, R.J., "Circulation Control for High Lift and Drag Generation on STOL Aircraft", Journal of Aircraft, vol. 12, No. 5, pp. 457-463, May 1975.

Brown, G., et al., "On Density Effects and Large Scale Structure in Turbulent Mixing Layers", Journal of Fluid Mechanics, vol. 64, Part 4, pp. 775-816, 1974.

Strykowski, P., et al., "The Effect of Counterliow on the Development of Compressible Shear Layers", Journal of Fluid Mechanics, vol. 308, pp. 63-69, 1996.

Englar, R., et al., "Test Techniques for High Lift, Two-Dimensional Airfoils with Boundary Layer and Circulation Control for Application to Rotary Wing Aircraft", Canadian Aeronautics and Space Journal, vol. 19, No. 3, pp. 93-108, Mar. 1973.

Liu, Y, et al., "Computational Evaluation of the Steady and Pulsed Jet Effects on the Performance of a Circulation Control Wing Section", AIAA 2004-56, 2004.

Englar, R.J., et al., "Application of Circulation Control to Advanced Subsonic Transport Aircraft, Part I: Airfoil Development", Journal of Aircraft, vol. 31, No. 5, pp. 1160-1168, Oct. 1994.

Englar, R.J., et al., "Application of Circulation Control to Advanced Subsonic Transport Aircraft, Part II: Transport Application", Journal of Aircraft, vol. 31, No. 5, pp. 1169-1177, Oct. 1994.

Wygnanski, I., "The Variables Affecting the Control Separation by Periodic Excitation", AIAA 2004-2505, Jun. 2004.

McManus, K., et al., "Airfoil Performance Enhancement Using Pulsed Jet Separation Control", AIAA 97-1971, 1997.

McManus, K., et al., "Separation Control in Incompressible and Compressible Flows Using Pulsed Jets", AIAA 96-1948, 1996.

Johari, H., et al., "Visualization of Pulsed Vortex Generator Jets for Active Control of Boundary Layer Separation", AIAA 97-2021, 1997.

International Search Report and Written Opinion dated Oct. 3, 2008 for International Application Serial No. PCT/US07/10122, International Filing Date: Apr. 24, 2007 consisting of 4 pages.

* cited by examiner

Comparison of the measured lift coefficient
for baseline NACA0025 and CFJ0025-065-196 airfoil.

Measured injection momentum coefficient
for CFJ0025-065-196 airfoil.

3-D Coefficient of lift versus angle of attack

CFJ 3-D Drag polar
compared to baseline

Momentum Coeficient
*Cμ* versus angle of attack

Lift and Drag profile at
AoA = 0° along wing span

3-D Wake profile plot
for $AoA = 0°$

DISCRETE CO-FLOW JET (DCFJ) AIRFOIL

CROSS-REFERENCE TO RELATED APPLICATION

This application is a continuation-in-part-of U.S. utility application Ser. No. 12/119,193, filed May 12, 2008, entitled CO-FLOW JET AIRCRAFT, which is a continuation-in-part-of PCT Application Ser. No. PCT/US07/10122, filed Apr. 24, 2007, entitled EMISSIONLESS SILENT AND ULTRA-EFFICIENT AIRPLANE USING CFJ AIRFOIL, which is related to and claims priority to U.S. provisional patent application Ser. No. 60/796,042, filed Apr. 28, 2006, entitled ENGINELESS EMISSIONLESS SILENT AND ULTRA-EFFICIENT AIRPLANE USING CFJ AIRFOIL; this application is also a continuation-in-part-of U.S. utility patent application Ser. No. 11/064,053, filed Feb. 23, 2005, entitled HIGH PERFORMANCE AIRFOIL WITH CO-FLOW JET FLOW CONTROL, which is related to and claims priority to U.S. provisional patent application Ser. No. 60/603,212, filed Aug. 20, 2004, entitled HIGH PERFORMANCE AIRFOIL WITH CO-FLOW JET FLOW CONTROL, the entirety of all of which is incorporated herein by reference.

STATEMENT REGARDING FEDERALLY SPONSORED RESEARCH OR DEVELOPMENT n/a

FIELD OF THE INVENTION

The present invention relates to aircraft design, propulsion, and operation.

BACKGROUND OF THE INVENTION

Conventional aircraft have traditionally made use of propellers or jet engine propulsion systems to generate thrust and the wings, in turn, generate the lift necessary to support the weight of the aircraft. These two systems, the propulsion and lift-generating systems, have always been treated separately. Unlike man-made vehicles, birds, insects and other flying animals do not have separate propulsion and lift systems. They rely on flapping wings to generate both lift and thrust. The down stroke of the flapping wings has a very large angle of attack (AoA) to the relative flow. Vortex shedding at both leading and trailing edges is the dominant flow phenomenon of a bird flapping its wings. The result is that the dynamic circulation of the flapping wing is so high that it generates sufficient lift to support the body weight of a bird, and at the same time, the high circulation generates very strong low pressure suction at the wing leading edge that results in a net thrust. Ornithopters use the same principle to fly, however, they are generally limited to very small unmanned air vehicles (UAV). This is generally due to the fact that driving the flapping wings for large aircraft is very difficult and inefficient. From studying bird flight, it can be deduced that if the circulation is sufficiently high, a wing can generate both lift and thrust. In view of the above, it would be desirable to provide an aircraft having an integrated propulsion and lift generating system, thereby reducing aircraft complexity, and greatly increasing performance and efficiency.

SUMMARY OF THE INVENTION

The present invention advantageously provides a system for an aircraft having an integrated propulsion and lift generating system and a method of operation, thereby reducing aircraft complexity, and greatly increasing performance and efficiency. In particular, the present invention may provide an aircraft having one or more fixed wings in a flying wing configuration, where the aircraft further includes a high performance co-flow jet (CFJ) airfoil to produce both lift and thrust rather than a conventional propulsion system (i.e., a propeller or jet engine). As a result, the energy expenditure is significantly reduced compared to that of a conventionally powered aircraft, as the energy consumption is largely limited to the power to provide a fluid flow across a portion of the aircraft, which does not necessarily require a combustion device. In addition, the maneuverability and safety of the aircraft is further enhanced due to the increased stall margin of the CFJ airfoil.

For this aircraft, the co-flow jet airfoil produces both the lift and thrust. The concept of the CFJ airfoil may generate extraordinary performance with a net zero drag (for cruise) or a net negative drag (thrust, for acceleration), as well as extremely high lift and stall margin. The aircraft may include a flying wing design with an increased surface area about which the CFJ may be integrated. By using such a configuration, the CFJ airfoil may extend across a substantial portion of the fuselage section of the aircraft.

The aircraft of the present invention may be advantageous for use across a wide range of applications. For example, the aircraft and methods of operation of the present invention may include an unmanned reconnaissance aircraft, small personal aircraft, commercial airliners, and many other applications.

The aircraft of the present invention may not necessarily be limited to flight on Earth, but also for exploratory missions to other planets. For example, the CFJ airplane may be particularly well suited for flight in the Martian atmosphere due to reduced energy consumption, enhanced maneuverability and safety, extremely short take off/landing distance, soft landing and take off with very low stall velocity. Such performance is desirable due to the limited amount of fuel that can be carried in a mission to Mars, the limited availability of take-off and landing space, as well as the challenges of flying in a low density atmosphere in a laminar flow regime.

The present invention can be also applied to helicopter or rotorcraft rotor blades to remove rotor blade dynamic stall, increase rotor blade lift, thrust, and efficiency. The CFJ or Discrete CFJ airfoil can be applied to any fluid-machineries that use airfoils. These include aircraft, gas turbine engine turbomachinery, helicopter/rotorcraft, pumps, wind turbines, propellers, among other blade related machinery The present invention further provides an aircraft having an aircraft body defining a leading edge, a trailing edge, a first wing having a first wingtip and a second wing having a second wingtip. The aircraft may include an injection opening proximate the leading edge; a recovery opening located between the injection opening and the trailing edge; one or more engine portions positioned between the recovery opening and the trailing edge., where the one or more engine portions include an exhaust portion, compressor stages, and/or an air inlet leading to the compressor stages.

The aircraft body may define a shape substantially similar to a flying wing, wherein the injection opening and/or the recovery opening may extend along a substantial length between the first and second wingtips. In addition, the recovery opening may be in fluid communication with a fluid intake of the one or more engines, and may also be in fluid communication with a fluid path leading to the injection opening. The one or more engines can provide a pressurized fluid output to the injection opening. The aircraft body may define an arcuate tail portion having an upper surface, where one or more engines are at least partially integrated into the upper surface of the arcuate tail portion, and the arcuate tail portion may define one or more depressions adjacent an exhaust path of the one or more engines. One or more ailerons may reside on the tail portion, while the first and second wings may define unitary bodies devoid of movable flaps.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

The present invention advantageously provides an aircraft having an integrated propulsion and lift generating system, thereby reducing aircraft complexity, and greatly increasing performance and efficiency. In particular, the present invention may provide an aircraft having one or more fixed wings in a flying wing configuration, where the aircraft further includes a high performance co-flow jet (CFJ) circulating about at least a portion of an aircraft surface to produce both lift and thrust rather than or in addition to a conventional propulsion system (i.e., a propeller or jet engine). The present invention provides an aircraft having an injection slot near a leading edge of the aircraft body and a recovery slot near a trailing edge of the aircraft body. A high energy jet or fluid stream may be injected near the leading edge in the same direction of the main fluid flow across the aircraft and substantially the same amount of mass flow may be recovered near the trailing edge. The fluid flow jet may then be recirculated to maintain a zero-net mass flux flow control.

Figure 1:
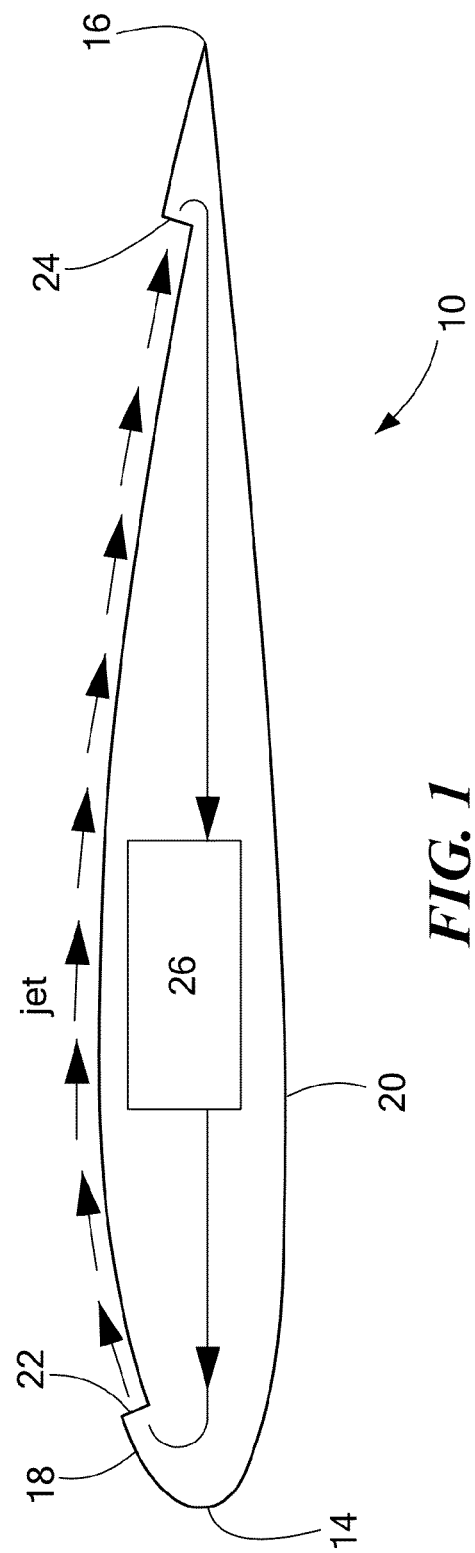
FIG. 1 shows an embodiment of a co-flow jet airfoil in accordance with the present invention.

Now referring to FIG. 1, an aerodynamic structure 10 is shown having a chord length, a leading edge 14, and a trailing edge 16. The leading edge 14 is the portion of the aerodynamic structure 10 which interacts with fluid first, i.e., the "front" of the structure 10, with the trailing edge 16 located at the rear point of the aerodynamic structure 10. The aerodynamic structure 10 further includes a first surface 18 that generally defines a surface extending from the leading edge 14 to the trailing edge 16. A second surface 20, which is opposite the first airfoil surface 18, also generally defines a surface extending from the leading edge 14 to the trailing edge 16. The first surface 18 corresponds to the suction side of the aerodynamic structure 10, i.e., the first surface 18 experiences a pressure lower than that experienced across the second surface 20 when the aerodynamic structure 10 is subjected to a fluid flow.

The first surface 18 also defines an injection opening 22 located between the leading edge 14 and the trailing edge 16, and further defines a recovery opening 24 located in between the injection opening 22 and the trailing edge 16. In an exemplary embodiment, the injection opening 22 is located less than 25% of the chord length from the leading edge 14 of the structure. To increase the effectiveness of the adverse pressure gradient to enhance mixing, the injection opening 24 may be located downstream of the leading edge suction peak of the aircraft body and/or airfoil. However, the benefits of the present invention may be realized with the injection opening located within 80% of the chord length from the leading edge 14. Moreover, the recovery opening 24 may be located less than 25% of the chord length from the trailing edge 16 of the aerodynamic structure. Similarly to the injection opening placement, however, the benefits of the present invention may be realized with the recovery opening 24 located within 80% of the chord length from the trailing edge 16. The injection opening 22 defines an injection opening height, which may have a value that is generally less than 5% of the chord length. The recovery opening 24 defines a recovery opening height, which may have a value generally less than 5% of the chord length. While the injection and recovery openings illustrated have a fixed size, an alternative embodiment can include openings capable of having their height varied through the use of mechanical means in which at least a portion of the first surface 18 is moveable, thereby changing the height of either the injection opening or the recovery opening.

The aircraft may include a pressurized fluid source and/or a vacuum source 26. The vacuum source may provide a pressure lower than an ambient pressure. The pressurized fluid source may be in fluid communication with the injection opening 22, and can include a pump or other means of pressurizing a fluid. The vacuum source may be in fluid communication with the recovery opening 24, and may also include a pumping apparatus.

An exemplary use of the CFJ aircraft provides a method for reducing the boundary layer separation of an aerodynamic structure. The aerodynamic structure 10 may be operated such that a first mass of fluid is routed from the pressurized fluid source towards the injection opening. The first mass may be routed by any means of conducting a fluid, i.e., a conduit, tubing, or the like. The first mass may be dispersed out of the injection opening and directed substantially tangent to the exterior surface of the aerodynamic structure 10 and towards the recovery opening 24. Concurrently, the vacuum source creates a pressure at the recovery opening 24 lower than that of the environment external to the recovery opening 24, resulting in a second mass of fluid being drawn into the recovery opening 24.

Although the injection and recovery of fluid along the aerodynamic structure can be realized by separate and independent injection and recovery resources, the fluid flow can also be recirculated by a pump system. The second mass can then be drawn into the recovery opening 24 and directed to the front stage of a compressor or the inlet where the pressure is low. The fluid flow is hence recirculated to save energy expenditure. Further, the fluid can be provided by a compressed air supply, such as a pressurized tank.

Figure 2:
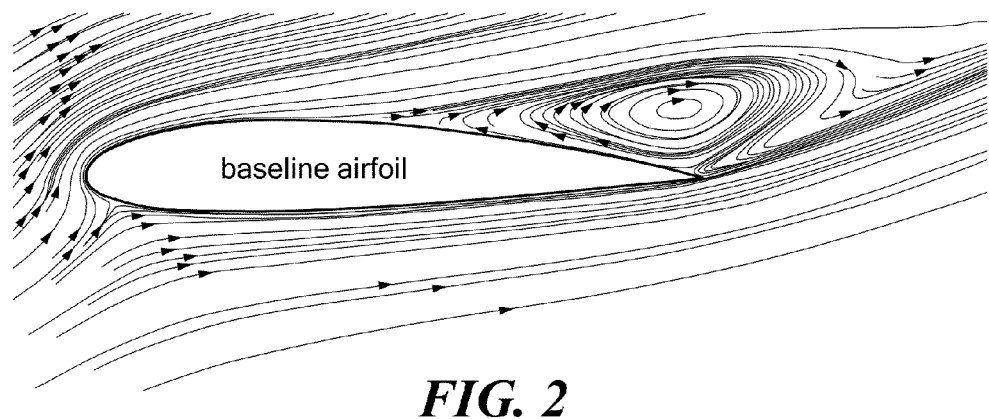
FIG. 2 depicts a fluid flow field for a conventional airfoil of the prior art.
Figure 3:
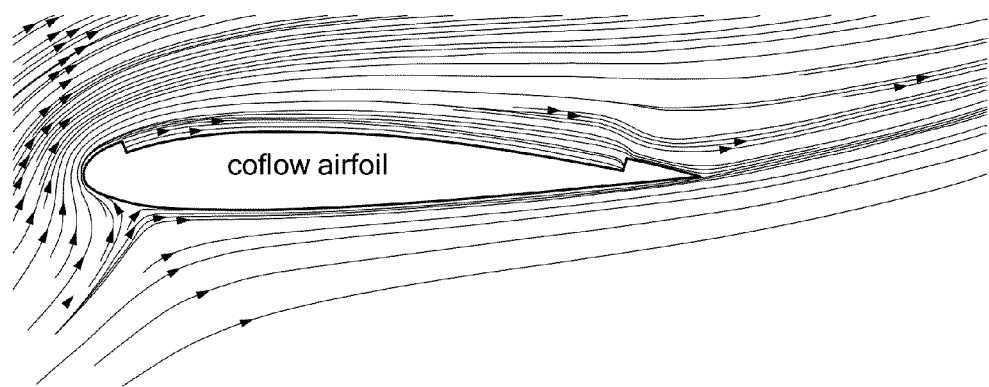
FIG. 3 illustrates a fluid flow field for an embodiment of a co-flow jet airfoil in accordance with the present invention.

The fundamental mechanism involved with a CFJ aircraft structure is that the severe adverse pressure gradient on the suction surface of an aircraft and/or airfoil strongly augments the turbulent shear layer mixing between the main fluid flow and the jet. The mixing then creates the lateral transport of energy from the jet to the main flow and allows the main flow to overcome the large adverse pressure gradient and remain attached even at high angles of attack. The stall margin is hence significantly increased. At the same time, the high momentum jet drastically increases the circulation about the aircraft, which significantly augments lift, reduces drag and/or even generates thrust (net negative drag). For example, as shown in FIGS. 2 and 3, a typical comparison illustrates that the prior art airfoil has significant separation at high angle of attack, whereas the CFJ airfoil has fluid flow that is significantly more attached at the trailing edge. The flow begins to separate at high angles of attack for a conventional baseline airfoil with no flow control. With the implementation of the CFJ, however, the Co-Flow Jet over the suction surface of the airfoil acts to overcome the adverse pressure gradient, thus keeping the flow attached, even at extremely large angles of attack. With an attached flow at a high angle of attack, the stall margin and maximum lift are significantly increased. For example, experimental wind tunnel tests have shown that flow will remain attached for certain airfoils at an angle of attack as high as 43 degrees, which comprises a significant increase over existing methods and structures. The energized boundary layer from the CFJ also results in drag reduction and even thrust generation (net negative drag) at low angles of attack. Continuing to refer to FIGS. 2 and 3, the flow over the lifting surface is shown as separated at approximately the midline of the surface of the baseline airfoil, while at this same angle of attack, the streamlines depicted around the Co-Flow Jet airfoil show the flow remains attached.

When compared with a conventional, prior art circulation control (CC) airfoil, the working mechanism of aircraft of the present invention is different. A CC airfoil relies on large leading edge (LE) or trailing edge (TE) to have the Coanda effect and enhance circulation. The large TE or LE may generate large drag during cruise. The aircraft of the present invention may include wall jet mixing to energize the main flow and overcome the adverse pressure gradient so that the flow can induce high circulation and remain attached at high AoA. The CC airfoil dumps away the jet mass flow, which is a considerable penalty to the propulsion system. The aircraft of the present invention, on the other hand, may recirculate the jet mass flow and achieve the zero net jet mass flux to have very low energy expenditure. Compared with the synthetic jet flow control, the enhancement of aircraft and/or airfoil performance having an injected and recovered fluid flow stream or jet is much more drastic because the interaction of the main flow with the synthetic jet generated either by acoustic waves or plasma is generally too weak. As a result, the aircraft of the present invention may simultaneously achieve three radical improvements at low energy expenditure: lift enhancement, stall margin increase, and drag reduction or thrust generation.

Control volume analysis indicates that the drag or thrust of a CFJ airfoil measured in the wind tunnel is the actual force acting on the airfoil or aircraft system in the stream-wise direction. This is not the same as the CC airfoil, which must consider the equivalent drag due to the suction penalty from the free-stream. For a CC airfoil, the equivalent drag is significantly larger than the drag measured in a wind tunnel and is also substantially larger than the drag of a CFJ airfoil. For a CFJ airfoil, the suction penalty is already included in the measured drag and is off set by the higher circulation and stronger leading edge suction induced by the CFJ. The drag reduction mechanism of a CFJ airfoil is not based on the conventional concept to reduce the skin friction. Instead, it relies on the inclusion of the pressure resultant force, which overwhelms the skin friction. When the leading edge suction is very strong, the low pressure at the leading edge provides a resultant force that is forward-pointing and is greater than the skin friction, resulting in the production of thrust. When a thrust is generated by the wing, the need for a conventional engine or propulsion system is significantly reduced, if not eliminated altogether.

Experimental analysis has indicated the performance enhancements provided by the CFJ airfoil. For example, an airfoil having a 6" chord and 12" span (to fit the 12"×12"×24" test section) was analyzed. Due to the small size of the tested airfoil, a thick airfoil, NACA0025, was selected to facilitate the instrumentation and internal ducts. The freestream Mach number was 0.1, the Reynolds number was about $4 \times 10^5$. To mimic the turbulent boundary layer with a large Reynolds number as in a realistic flight situation, a leading edge trip was implemented to enforce the turbulent boundary layer. The co-flow jet airfoils are named using the following convention: CFJ4dig-INJ-REC, where 4dig is the same as NACA 4 digit convention, INJ is replaced by the percentage of the injection slot size to the chord length and REC is replaced by the percentage of the recovery slot size to the chord length. For example, the CFJ0025-065-196 airfoil has the injection slot height of 0.65% of the chord and the recovery slot height of 1.96% of the chord. The CFJ0025-131-196 has a twice as large injection slot size with the same recovery slot size as the CFJ0025-065-196. The injection and recovery slot of the tested airfoil were located at 7.11% and 83.18% of the chord from the leading edge.

Figure 4:
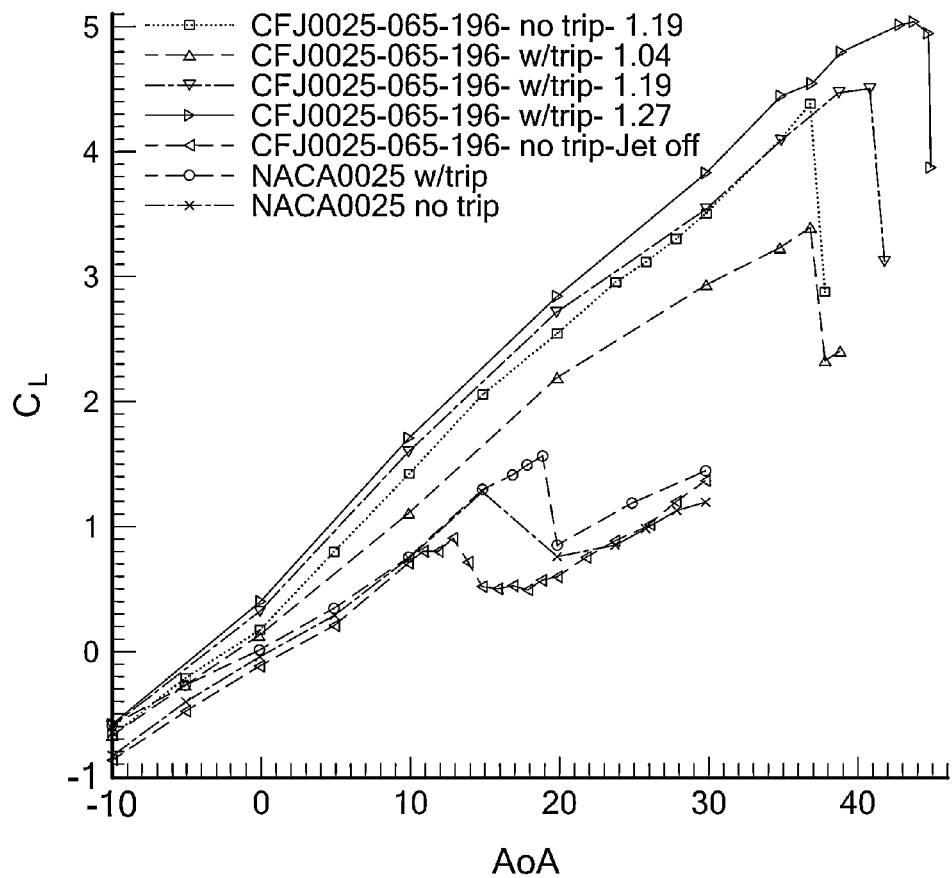
FIG. 4 is a graphical illustration of a comparison of a measured lift coefficient for both conventional airfoils of the prior art as well as embodiments of a co-flow jet airfoil in accordance with the present invention.

FIG. 4 illustrates the comparison of measured lift coefficient for the baseline NACA0025 airfoil and the CFJ0025-065-196 airfoil with the injection total pressure coefficient given (the last number in the legend, normalized by freestream total pressure). During a test, the injection total pressure was held as constant while the AoA varies. A higher injection total pressure will yield a higher injection momentum coefficient, and hence a higher lift coefficient and stall margin. The bottom two curves with circle and cross symbols are for the baseline NACA0025 airfoil with and without LE trip. It shows that the one with trip delays stall by about 4 degrees of AoA. This is because the fully turbulent boundary layer with the trip is more resistant to flow separation. The very bottom curve is the CFJ airfoil without the jet on. It has less stall AoA than the baseline airfoil because the injection and suction slot steps weaken the boundary layer and make separation occur at a smaller AoA. The results shown in FIG. 3 indicate that the CFJ airfoil significantly increases the lift and stall angle of attack over that of a conventional airfoil.

Table 1 lists the aerodynamic parameters of the baseline NACA0025 airfoil and the CFJ0025-065-196 airfoil with injection total pressure coefficient of 1.27. Table 1 indicates that the $C_{Lmax}$ of the CFJ0025-065-196 airfoil is 5.04, whereas the maximum lift coefficient of the baseline airfoil is 1.57, a 220% increase. The baseline airfoil stalls at AoA of 19°, while the CFJ0025-065-196 airfoil stalls at AoA=44°, an increase of 153%.

TABLE 1

| Airfoil | $AoA_{CL} = 0$ | $C\mu_{CL} = 0$ | $AoA_{CLmax}$ | $C_{Lmax}$ | $C\mu_{CLmax}$ | $C_{Dmin}$ (AoA = 0°) |
|---|---|---|---|---|---|---|
| Baseline NACA-0025 | 0° | 0.0 | 19° | 1.57 | 0.0 | 0.128 |
| CFJ0-025-065-196 | −4° | 0.187 | 44° | 5.04 | 0.28 | −0.036 |

Figure 5:
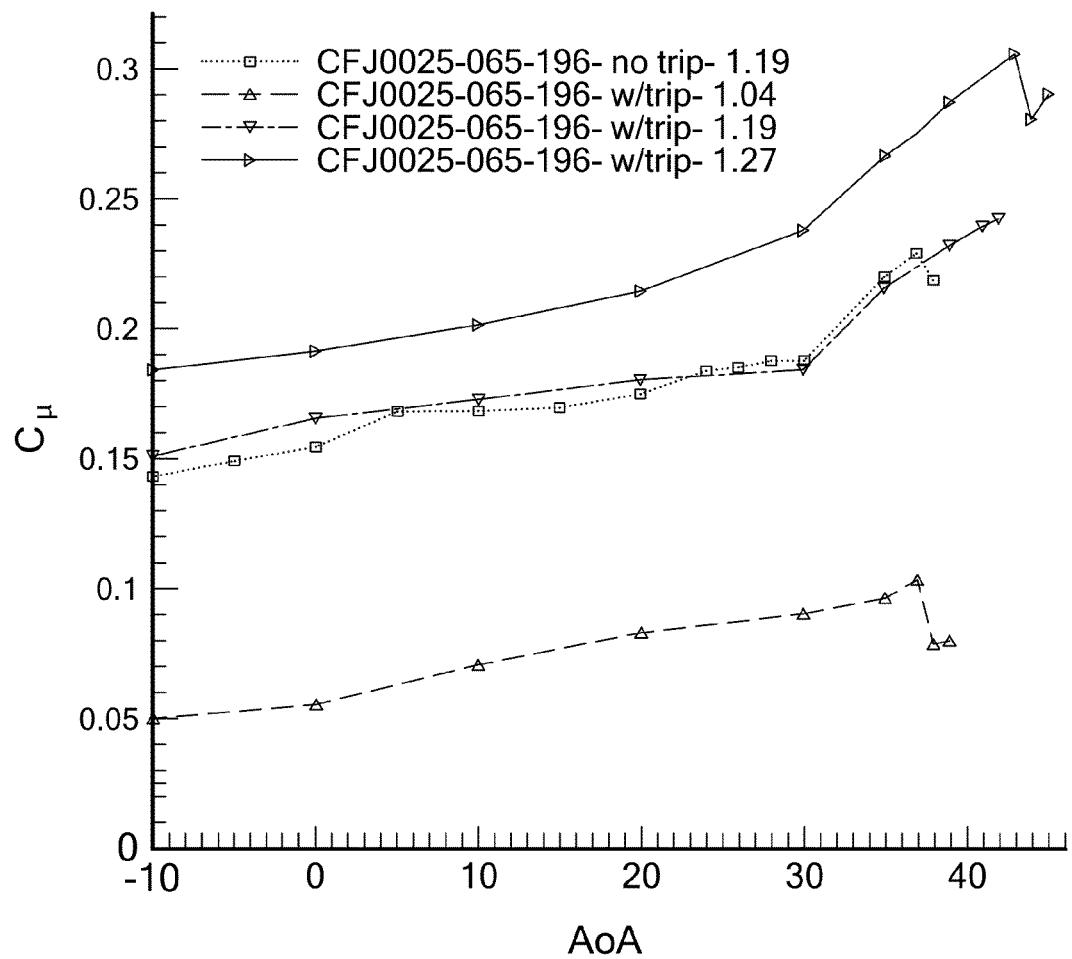
FIG. 5 is a graphical illustration of a measured injection momentum coefficient for embodiments of a co-flow jet airfoil in accordance with the present invention.

FIG. 5 illustrates the injection momentum coefficient, $C_\mu$, of the CFJ0025-065-196 airfoil at three different injection total pressures. The injection mass flow rate and velocity are determined by the injection total pressure and the mainflow static pressure at the injection location. The injection total pressure is held constant while the AoA varies. When the AoA is increased, the LE suction is stronger and hence the local static pressure at the injection location decreases. The injection velocity therefore will increase, so will the mass flow rate and the momentum coefficient as shown in FIG. 4. For the highest injection total pressure coefficient of 1.27, the momentum coefficient varies from 0.184 to 0.3. The lowest injection total pressure coefficient of 1.04 has the momentum coefficient varying from 0.05 to 0.1, which increases the $C_{Lmax}$ by 113% and AoA stall margin by 100%. These results indicate that even the small momentum coefficient is very effective to enhance the lift and stall margin.

Figure 6:
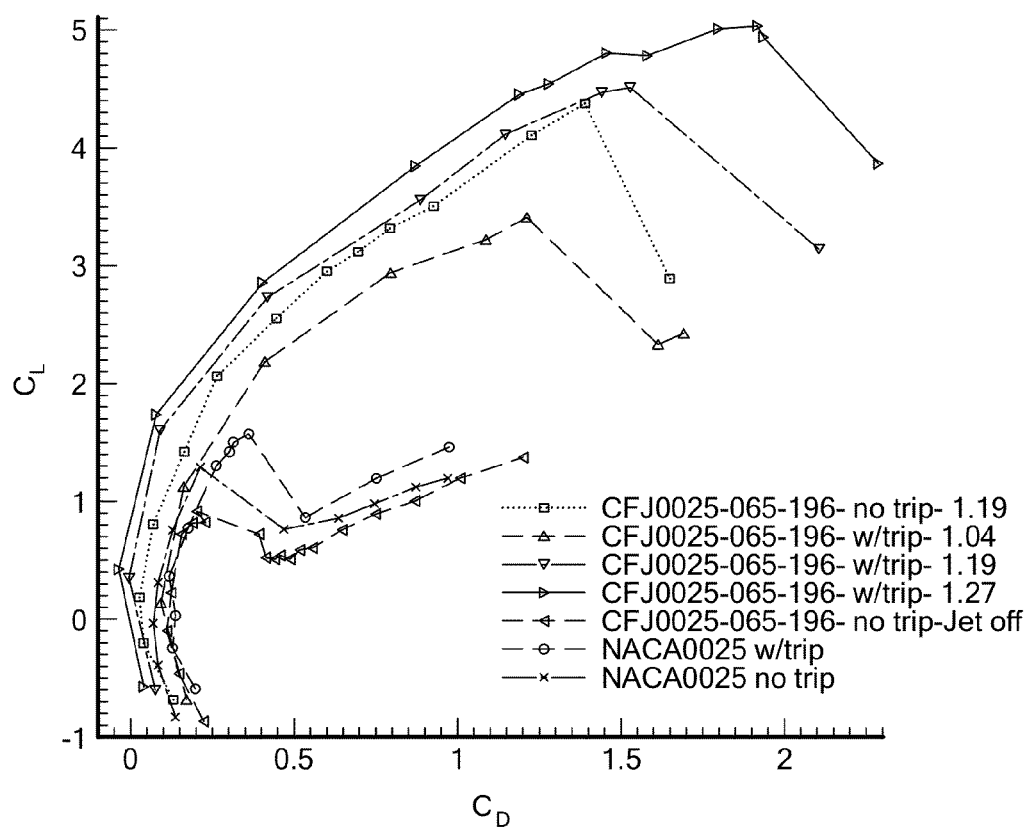
FIG. 6 is a graphical illustration of a comparison of a measured drag polar for both conventional airfoils of the prior art as well as embodiments of a co-flow jet airfoil in accordance with the present invention.

FIG. 6 is the drag polar of the CFJ0025-065-196 airfoil. The drag coefficient of the CFJ airfoil is significantly reduced and has a small region of negative drag (thrust). For example, at $C_L=1$, for $C_\mu=0.071$, the CFJ0025-065-196 airfoil drag reduction is 19%; for $C_\mu=0.197$, the drag reduction is 90%, which increases the L/D tenfold. At lower $C_L$ values with the total pressure coefficient of 1.27, the drag reduction is over 100% because the drag is negative and becomes thrust. When the drag becomes zero or negative, the conventional aerodynamic efficiency measurement of L/D may not be meaningful since it approaches infinity. At low AoA, the CFJ airfoil wake is filled with the energized mainflow and has inversed velocity deficit. In this case, the airfoil has no drag, but thrust. The airfoil drag can be decomposed to two parts: skin friction and pressure drag. The skin friction drag does not vary much when the AoA changes. Rather, it is the large pressure resultant force that significantly decreases the total drag or generates thrust (negative drag). The strong leading edge suction makes a significant contribution to the thrust generation or drag reduction.

Figure 7:
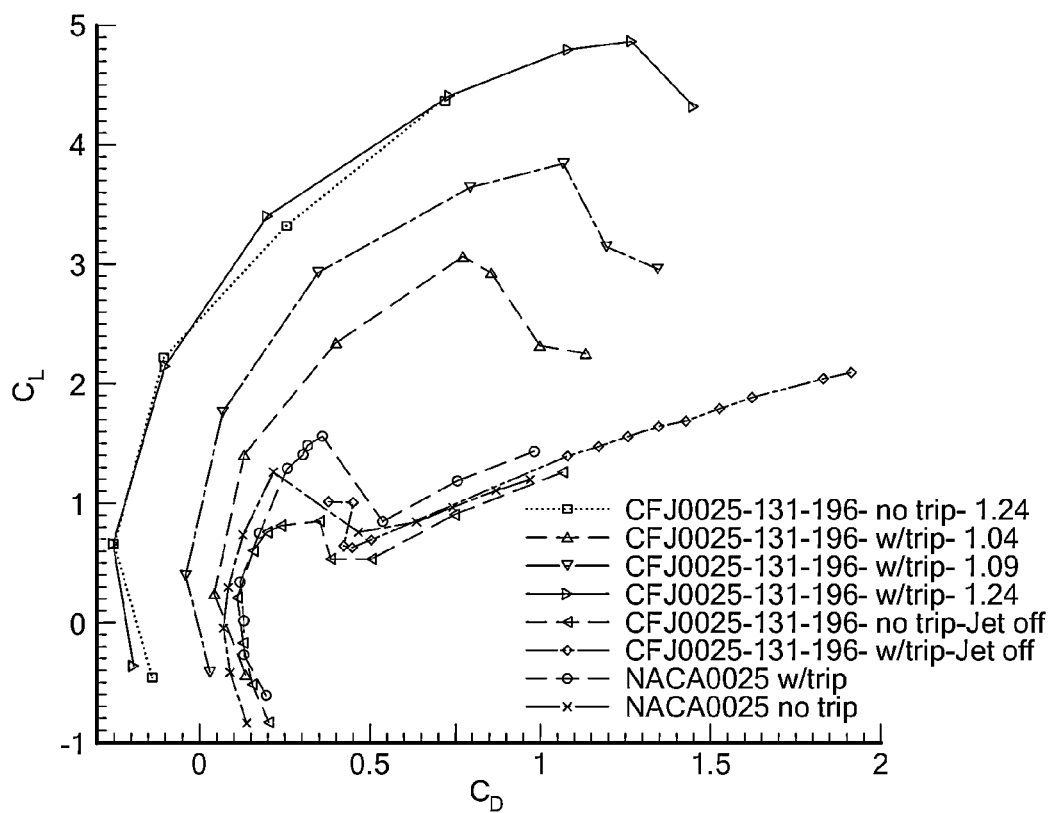
FIG. 7 is an additional graphical illustration of a comparison of a measured drag polar for both conventional airfoils of the prior art as well as embodiments of a co-flow jet airfoil in accordance with the present invention.

FIG. 7 is the drag polar of the CFJ0025-131-196 airfoil with the injection size and jet mass flow rate about twice larger than those of the CFJ0025-065-196 airfoil. The thrust (negative drag) region of the CFJ0025-131-196 airfoil is significantly larger than that of the CFJ0025-065-196 airfoil. For example, the CFJ0025-131-196 airfoil still has thrust at $C_L=2.0$, whereas the CFJ0025-065-196 airfoil has no thrust when the $C_L$ is greater than 0.9. This means that when the jet mass flow rate is increased, the thrust is also increased. In general, we can achieve the required thrust and lift by adjusting the jet strength. Based on the mass conservation law, a suction is needed whenever an injection is used for an airfoil flow control. For a CFJ airfoil, the suction occurs on the airfoil suction surface near trailing edge. For a CC airfoil, the suction occurs by drawing the jet mass flow from freestream through the engine inlet.

A control volume analysis was conducted to analyze the lift and drag breakdowns due to the jet ducts and the CFJ airfoil performance with and without jet suction. Based on the momentum and mass equations, the drag of a CFJ airfoil is:

$$D = R'_x - F_{xcfj} = \int_{wake} \rho V_e (V_\infty - V_e) \delta y \qquad \text{Eq. (1)}$$

where, $R'_x$ is the CFJ airfoil surface pressure and shear stress integral in x-direction. $F_{xcfj}$ is the reaction force generated by the injection and suction jet ducts in x-direction. $V_e$ is the velocity downstream of the airfoil. Eq.(1) indicates that the drag measured in the wind tunnel is the actual drag that the 2D CFJ airfoil will be acted on. The suction penalty is already included in $F_{xcfj}$ and is off set by the higher circulation and stronger leading edge suction induced by the CFJ that is included in $R'_x$. The integral in Eq.(1) shows that the drag of a CFJ airfoil is equal to the drag calculated by the wake profile. This is the same as a conventional non-controlled airfoil. However, this is not true for a circulation control airfoil. When CC airfoil is used for an airplane, the actual drag, or the "equivalent drag", needs to add the penalty caused by drawing the jet mass flow from freestream. The equivalent drag coefficient of a CC airfoil can be written as:

$$C_{Dequiv} = C_{Dwindtunnel} + C\mu(V_{ei}/V_j) + C\mu(V_{ei}/V_j)M^2_{ei}) \qquad \text{Eq. (2)}$$

The first term on the right hand side of Eq.(2) is the CC airfoil drag measured in wind tunnel, the 2nd term is the ram drag, and the 3rd term is the drag due to the captured area. The subscript ei stands for engine inlet, j stands for injection jet. The results based on CFD simulation indicate that the equivalent drag of a CC airfoil is also significantly larger than the drag measured in a wind tunnel and is substantially greater than the drag of a CFJ airfoil. The power consumed by a CC airfoil is hence also significantly more.

It has been suggested that the suction occurring on the airfoil suction surface such as the CFJ airfoil is much more beneficial to enhance airfoil performance than having the suction from freestream such as the CC airfoil. Compared with the airfoil with injection only, the CFJ airfoil has higher lift, higher stall margin, lower drag, and lower power required. A concept study based on CFD simulation indicates that it is possible for the CFJ airfoil to exceed the inviscid limit of maximum lift coefficient due to the high jet velocity inducing high circulation of the airfoil. For a cambered CFJ airfoil modified from NACA0025, a CFD calculated lift coefficient of 9.7 is obtained without using any flap, which is far greater than the inviscid maximum lift coefficient limit of 7.8.

In summary, the CFJ airfoil concept provides the following advantages: 1) significantly enhanced lift and suppress separation; 2) drastically reduced drag or generated thrust; 3) significantly increased AoA operating ranges and stall margins; 4) substantially reduced energy expenditure; 5) equally applicable to airfoils of varying thickness; 6) controllable for an entire flight and/or any portion thereof; 7) can be used for low and high speed aircraft; 8) easy implementation with no moving parts; 8) equally applicable for both fixed wings and rotating rotor blades.

Figure 8:
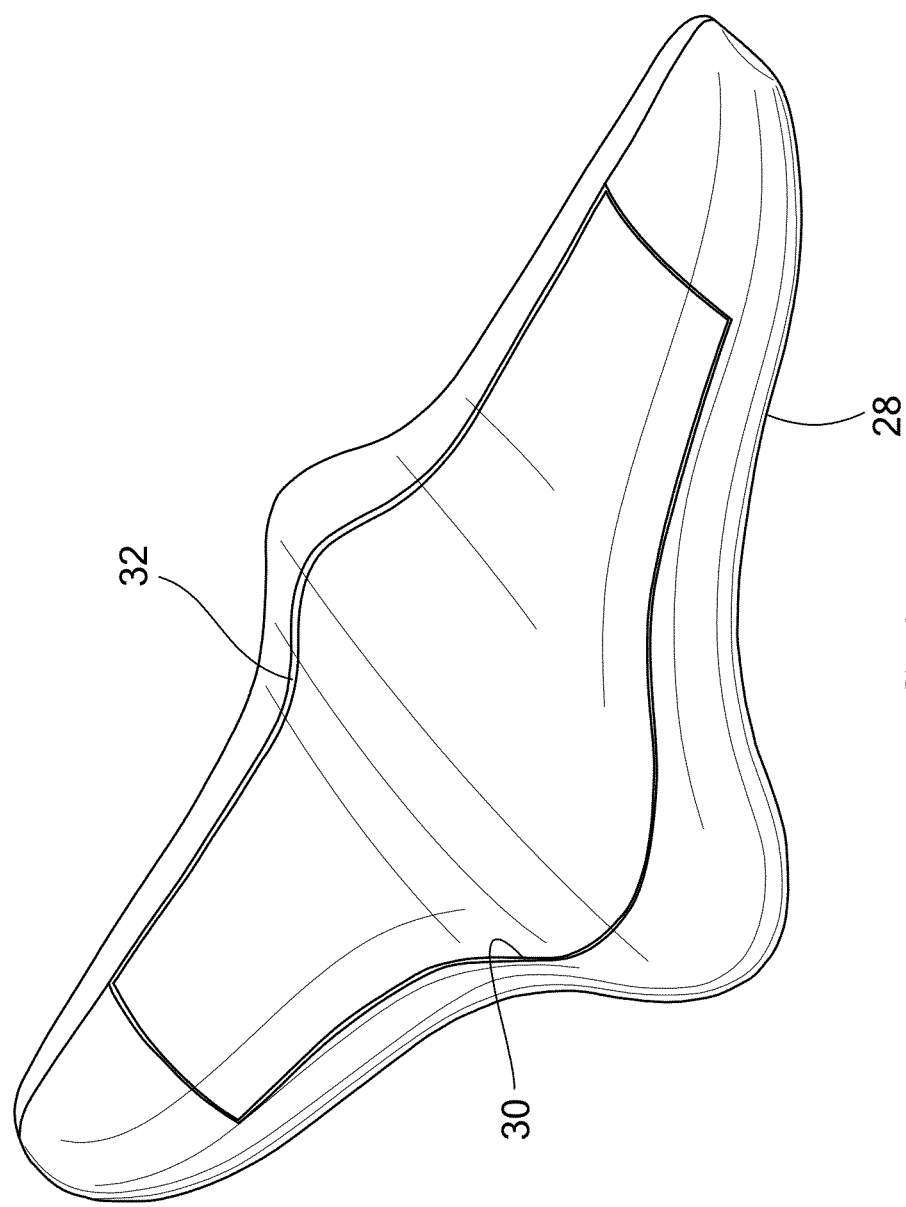
FIG. 8 shows an embodiment of an aircraft in accordance with the present invention.

The concept of CFJ airfoil has demonstrated the extraordinary performance to enhance lift, generate thrust, and increase stall margin. Now turning to FIG. 8, an aircraft 28 of the present invention may have an injection slot 30 and a recovery slot 32 such that a co-flow jet or stream of fluid is circulated across a substantial portion of a surface of the aircraft. The aircraft 28 defines an upper surface, where the upper surface may include a first portion and a second portion. The second portion may be recessed with respect to the first portion, and the second portion may comprise a substantial amount of the surface area of the upper surface. For example, the recessed portion may extend from a location proximate or otherwise close to a first wing tip to a location proximate a wing tip on the opposite side of the aircraft.

By providing the concept of the CFJ across an increased surface area of the aircraft 28, the aircraft thus would have a reduced and/or eliminated need for the inclusion of a propeller or jet engine system because the CFJ airfoil itself is capable of generating thrust. Accordingly, the thrust generated by implementation of the CFJ concept across a substantial portion of the aircraft surface can overcome the 3-D induced drag due to tip vortices. In particular, the aircraft 28 of the present invention may include a flying wing configuration as fluid jet can flow across almost the entire aircraft surface to achieve the maximum benefit, resulting in the generation of lift and thrust wherever it is applied. Thus, the only drag that needs to be overcome by the CFJ airfoil thrust would be the induced drag due to tip vortices. In order to operate, the airplane 28 may include a pumping system to draw the jet mass flow near the trailing edge and inject the jet near the leading edge as illustrated in FIG. 1. In addition, at different phases of the flight mission, the lift and thrust can be controlled by adjusting the jet strength. For example, during take off, a stronger jet may be used to generate high thrust and high lift, while at cruising speed, a weaker jet may be used due to lower lift coefficient and the amount of thrust required to remain in flight. Upon landing, the jet velocity and/or mass may be adjusted to allow the aircraft to fly at high angle of attack with high lift and high drag.

A conventional airplane draws the air flow from the freestream environment through the engine inlet, energizes the air through the combustion process, and then exhausts the high momentum air to the environment through the engine nozzle. Such a process is purely for thrust generation and has no interaction with the wing. The energy transfer from the chemical energy of combustion to mechanical energy (momentum increase) is usually very inefficient and accompanies a very large thermal energy (total enthalpy) loss of 50% or more. A CFJ wing draws the air flow on the suction surface of the wing near the trailing edge, pressurizes the air within the wing and then exhausts the same air near the wing leading edge. Such a process has a direct interaction with the wing and enhances the wing lift by inducing a large circulation and generates a thrust at the same time. The mass flow of the jet may be substantially less than that of a jet engine. The jet recirculation or pumping process (recovery and injection) requires less power than that of a jet engine and can be achieved using electric power. The energy transfer is from mechanical energy (pumping the CFJ) to mechanical energy (high momentum injection jet) and therefore the efficiency is much higher. No combustion process is needed and as such, emissions may be completely eliminated.

The power required to pump the jet for this aircraft may be significantly less than the power required to run a conventional jet engine. When the power is consumed to generate the CFJ and enhance lift, it also reduces the drag or produces thrust at the same time. For the conventional airplanes, the power system is used only to overcome the drag without enhancing lift coefficient. The equivalent L/D of the CFJ airplane hence is much higher than that of the conventional airplane. Since the lift coefficient of the CFJ airfoil element is significantly higher than the conventional airfoil, the overall lifting surface area to have the same payload will thus be much smaller. The weight of the airplane and the drag due to the whetted surface will be also significantly reduced. With no aircraft engines, the weight of the engines and the drag due to the engine nacelles and captured area will also be removed. The reduced weight and drag will further reduce the energy consumption.

The power required to pump the jet is determined by the ratio of the total pressure at the injection and suction and the mass flow rate of the jet. Compared with a jet engine system, the reduction of power needed for a CFJ system results from the following: 1) the mass flow rate of the jet may be much smaller than the mass flow rate of the jet engine; the conservative estimation is that the maximum jet mass flow rate would not exceed 30% of that of a conventional jet engine; 2) the total pressure ratio to pump the jet may be much smaller than the total pressure ratio of a jet engine compressor. For example, if the injection total pressure is 2 times the static pressure in the injection slot area, the injection jet Mach number will be 1.05. Usually, the injection jet speed will be limited to lower than sonic speed for subsonic flight. Both FIGS. 6 and 7 list the injection total pressure normalized by the freestream pressure (the last numbers in the legend). They are not greater than 1.27. The compressor total pressure ratio of a modern jet engine is usually about 30, which is far greater than the total pressure required to pump the jet; 3) the CFJ injection and recovery are at the most energy efficient locations. The recovery is near the trailing edge where the pressure is the highest on the airfoil except the LE stagnation point. The flying wing embodiment of the aircraft of the present invention may also eliminate the need for a conventional tail structure. Instead, winglets could be located at the wingtips for lateral stability and control. These winglets make use of a symmetric airfoil cross-section. The use of a conventional tail may be avoided in order to reduce instabilities introduced during planetary entry. Horizontal stability and control may be provided by a more conventional pair of flaperons on the aft of the wings injection is right downstream of the leading edge suction peak where the pressure is the lowest. The pressure gradient is favorable to recirculate the jet and minimize the power required to pump and energize the jet.; 4) No combustion is needed and hence no thermal loss occurs; 5) The overall engineless airplane weight and drag is much less than the conventional airplane. The energy expenditure is hence greatly reduced.

As discussed, use of the CFJ system across at least a portion of an aircraft may significantly reduce energy expenditure. The reduction of the power required for an Engineless CFJ airplane could be up to 70% or more when compared to that of a conventional, combustion driven jet engine. The lower power consumption of a CFJ airplane provides much longer range and endurance than a conventional airplane. In addition to energy expenditure, the CFJ aircraft may have extremely short take off/landing (ESTOL) distance due to the very high maximum lift coefficient. For the same reason, the stall velocity will be significantly lower than the conventional airplane. The lower stall velocity will allow soft landing and take off at substantially lower speed. Another important use of CFJ airfoil during take off/landing is to enhance the subsonic performance of a supersonic wing for a supersonic airplane. Moreover, due to the high stall margin, the CFJ airplane will have significantly higher maneuverability and safety margin to resist severe weather conditions, such as unexpected gusts of wind. The high stall margin is also particular useful for Mars airplanes to resist flow separation and stall at low Reynolds number.

Again referring to FIG. 8, unlike most conventional aircraft, where the wings and fuselage are separate structures, the aircraft of the present invention may include an airframe where both of these components are incorporated into a single, blended body. This is typically called a flying wing configuration, because the entire aircraft effectively acts as a wing. Because the fuselage may have the same airfoil cross section as the wings, it acts as an extension of the same and thus produces additional lift. This particular embodiment also allows for an increased coverage area for the CFJ mechanism, therefore increasing the benefits gained from using it.

A flying wing design also allows for a reduction in the wingspan of the aircraft. As the fuselage surface is no longer "wasted", but made to produce lift, the aircraft can produce increased lift with a shorter wingspan. This feature is desirable particularly for Martian applications because, in order to reach Mars, the aircraft must be packaged within an aeroshell. The goal is generally to be able to fit the aircraft within an aeroshell while minimizing the number of folds necessary. An aircraft which needs to unfold once it is deployed into the atmosphere is generally less stable and safe due to the increased complexity. An increased number of folds will also increase the probability of failure during deployment, which is the most critical step during the aircraft's mission.

Figure 9:
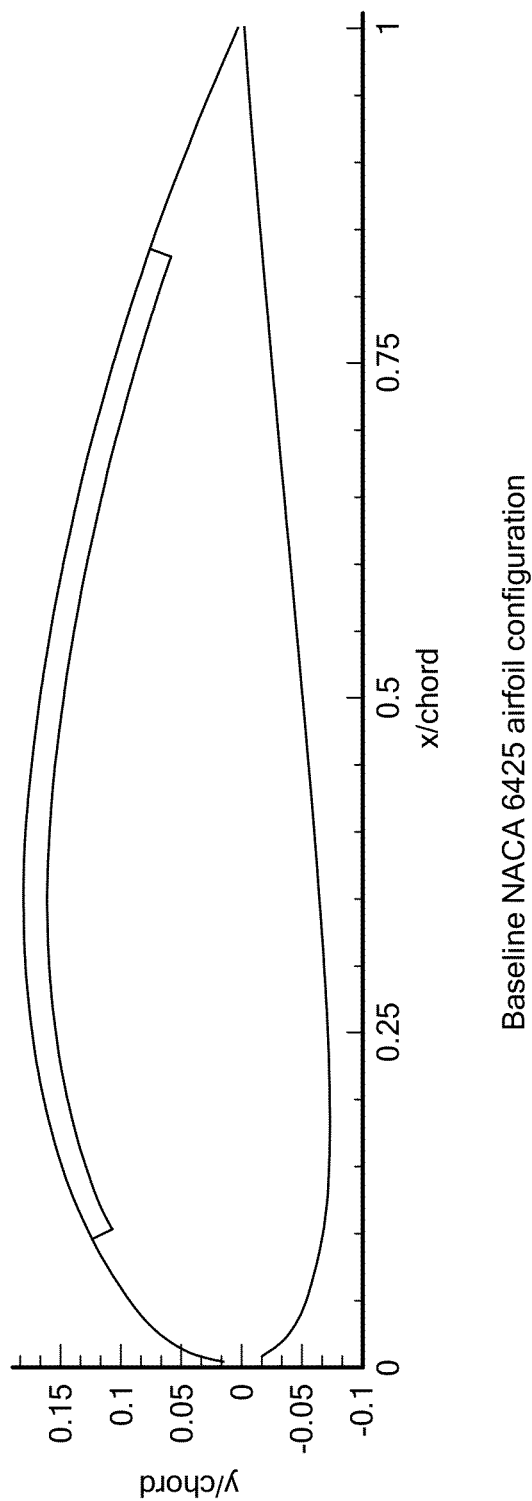
FIG. 9 depicts a baseline NACA 6425 airfoil of the prior art.

As discussed above, the baseline airfoil chosen for comparison to the CFJ aircraft of the present invention is the NACA 6425 airfoil, which can be seen in FIG. 9. This airfoil has a camber of 6% located 40% from the leading edge, with a maximum thickness of 25% of the chord. This airfoil was chosen for its moderate camber and high thickness. The high thickness would allow for comfortable placement of all of the CFJ components, such as the pump and ducting. Also, airfoils with high thicknesses will produce higher lift as long as the air flow remains attached. Conventional aircraft shy away from thicknesses higher than 15% due to separation. However, with the use of the CFJ, a higher thickness airfoil can be used without fear of separation occurring, and therefore an even higher lift can be achieved. A moderate camber was chosen in order to reduce the effect of wing-tip vortices. A higher camber airfoil will produce a higher lift, but there is a penalty in the form of stronger induced drag from wing-tip vortices.

A Computational Fluid Dynamics (CFD) study has been performed for the CFJ aircraft, which demonstrates its increased performance over a conventional aircraft. CFD analysis was performed for both the two-dimensional and three-dimensional cases at a range of angles of attack (AoA) using both the baseline and CFJ airfoil. The simulations were run at a Reynolds number of $2 \times 10^6$ and a Mach number of 0:1. These computations were carried out for an aircraft with an aspect ration of AR=4.

For the 2-D case, the simulations show that separation occurs for the baseline airfoil at 16° AoA, while flow separation (stall) occurs at 35° AoA for the CFJ airfoil, a 19° difference, as shown in Table 2. This constitutes a significant increase in performance because a higher lift can be produced without the danger of stalling, even at a relatively low Mach number of 0.1. These results imply that the stall velocity for such an aircraft would be drastically reduced, and operational angle of attack vastly increased. A lower stall velocity and increased lift can lead to reduced take-off and landing distances, which is a very highly desirable trait.

TABLE 2

| AoA | BL $C_l$ | CFJ $C_l$ | BL $C_d$ | CFJ $C_d$ |
| --- | --- | --- | --- | --- |
| 0 | 0.0542 | 2.8517 | 0.0232 | −0.9855 |
| 10 | 1.3946 | 3.9734 | 0.0408 | −0.5939 |
| 15 | 1.5225 | 5.0729 | 0.0558 | −0.3168 |
| 20 | 1.4431 | 5.4402 | 0.0686 | −0.1217 |
| 30 | 1.1147 | 6.5638 | 0.1690 | 0.2613 |
| 35 | 0.9348 | 5.5526 | 0.2342 | 0.1913 |

Furthermore, it can be seen that the two-dimensional drag coefficient $C_D$ is negative in the case of the CFJ airfoil at angles of attack as high as 20°. The drag coefficient becomes positive at high angles of attack because the form drag has become large enough at that point to overcome the thrust generated by the CFJ airfoil. However, it would be improbable that the aircraft would ever need to fly in conditions where the angle of attack were so high. Even at high angles of attack, however, the drag coefficient of the CFJ airfoil is much lower than that of the baseline airfoil, reducing the high drag generated at such conditions.

3-D CFD simulations have been performed for the three-dimensional Engineless CFJ aircraft in a range of angles of attack from 0° to 45°, using the same Reynolds and Mach numbers as in the 2-D case. The results obtained from the post-processing of the data were corrected to include the jet effects. Although the corrected results are not as favorable as the uncorrected ones, they still show a very significant increase in performance over the baseline.

Figure 10:
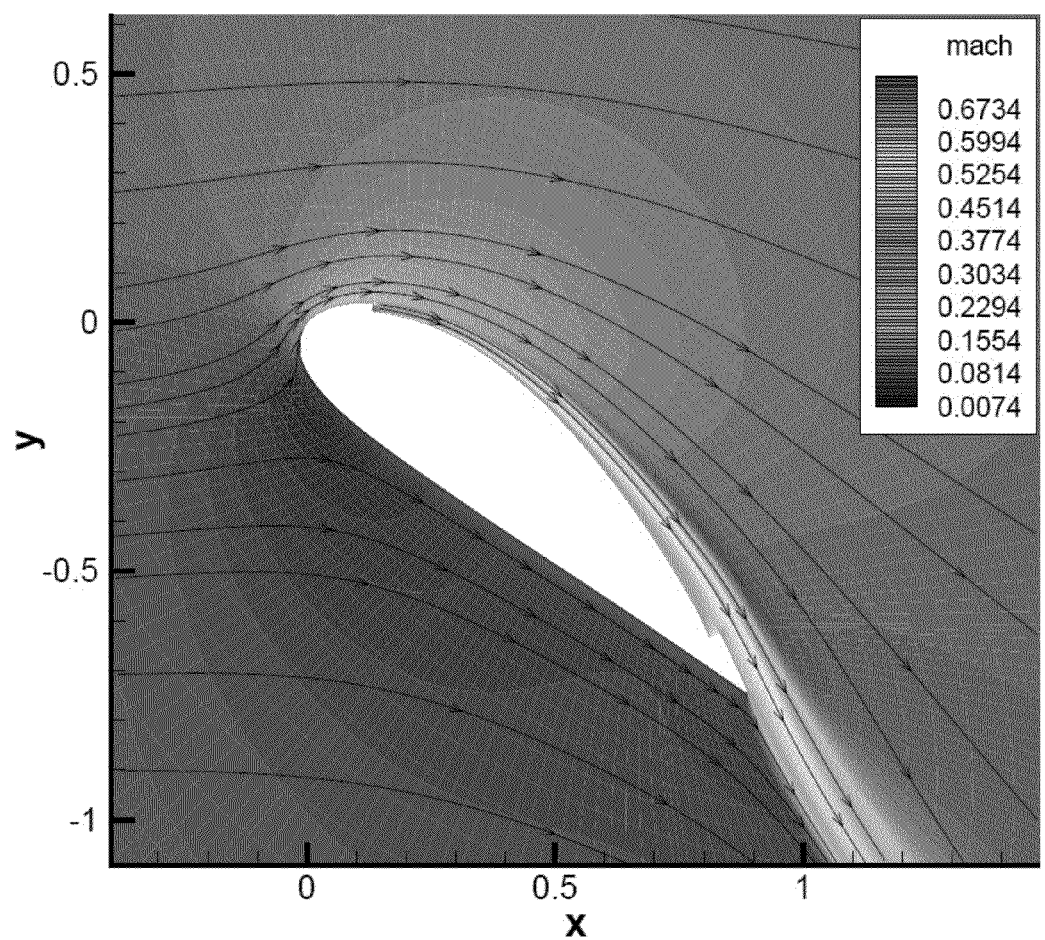
FIG. 10 is a graphical illustration of three-dimensional streamlines at root for an embodiment of an aircraft having an angle of attack equal to 40° in accordance with the present invention.
Figure 11:
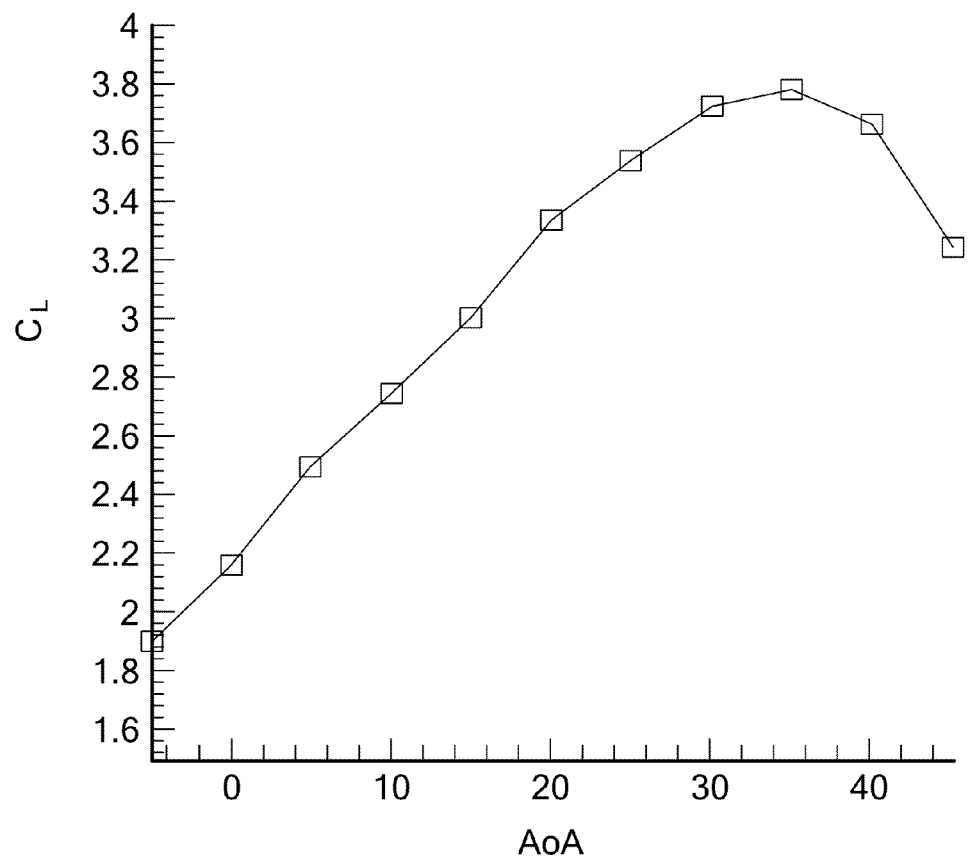
FIG. 11 is a graphical illustration of a three-dimensional coefficient of lift versus angle of attack for an embodiment of an aircraft in accordance with the present invention.
Figure 12:
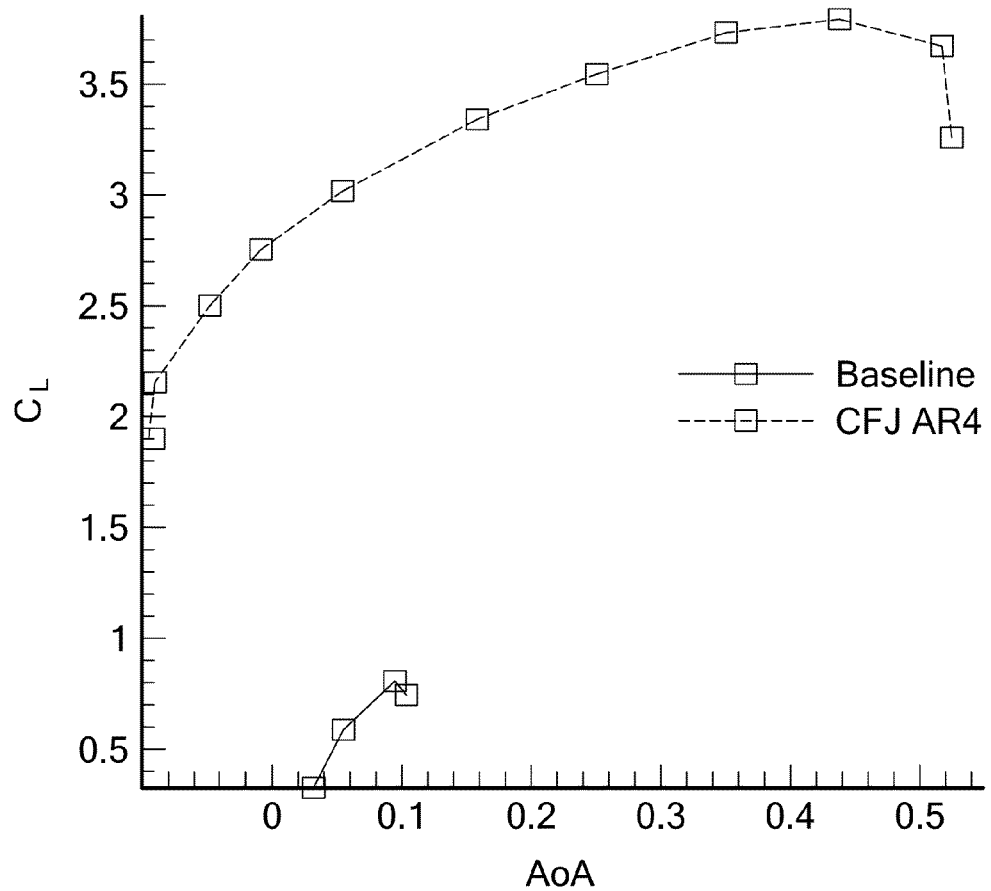
FIG. 12 is a graphical illustration of a comparison of a measured drag polar for both a conventional airfoil of the prior art as well as embodiments of a co-flow jet airfoil in accordance with the present invention.
Figure 13:
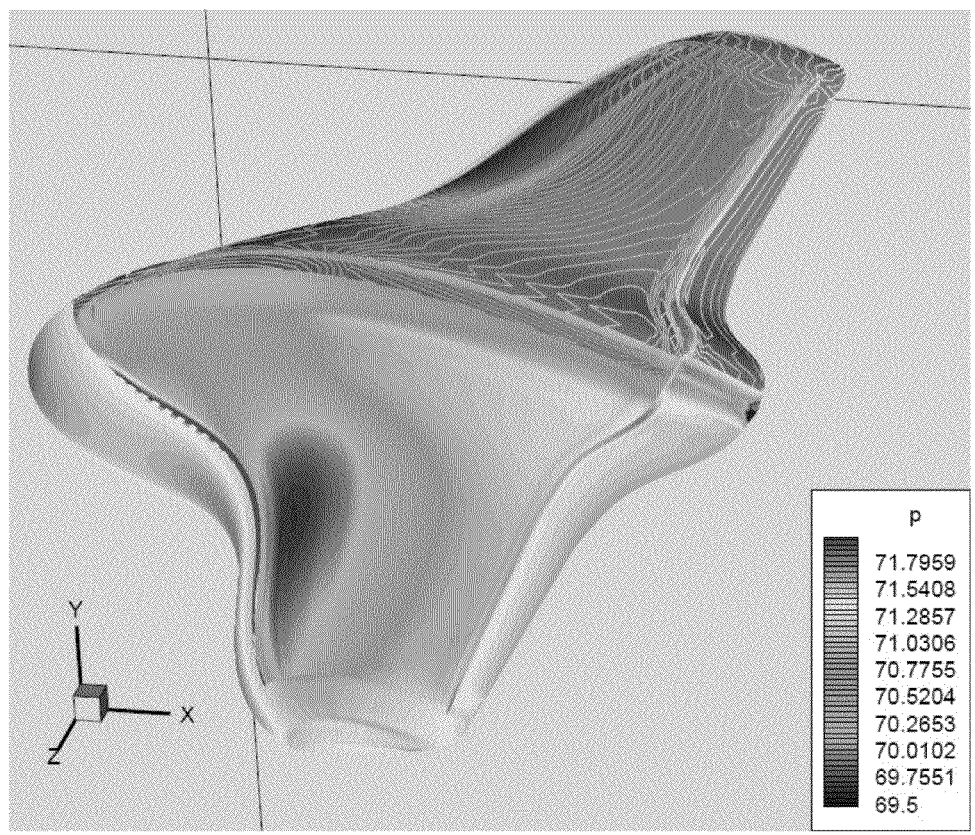
FIG. 13 is an illustration of three dimensional surface pressure contours at an angle of attack equal to 0° for an embodiment of an aircraft in accordance with the present invention.
Figure 14:
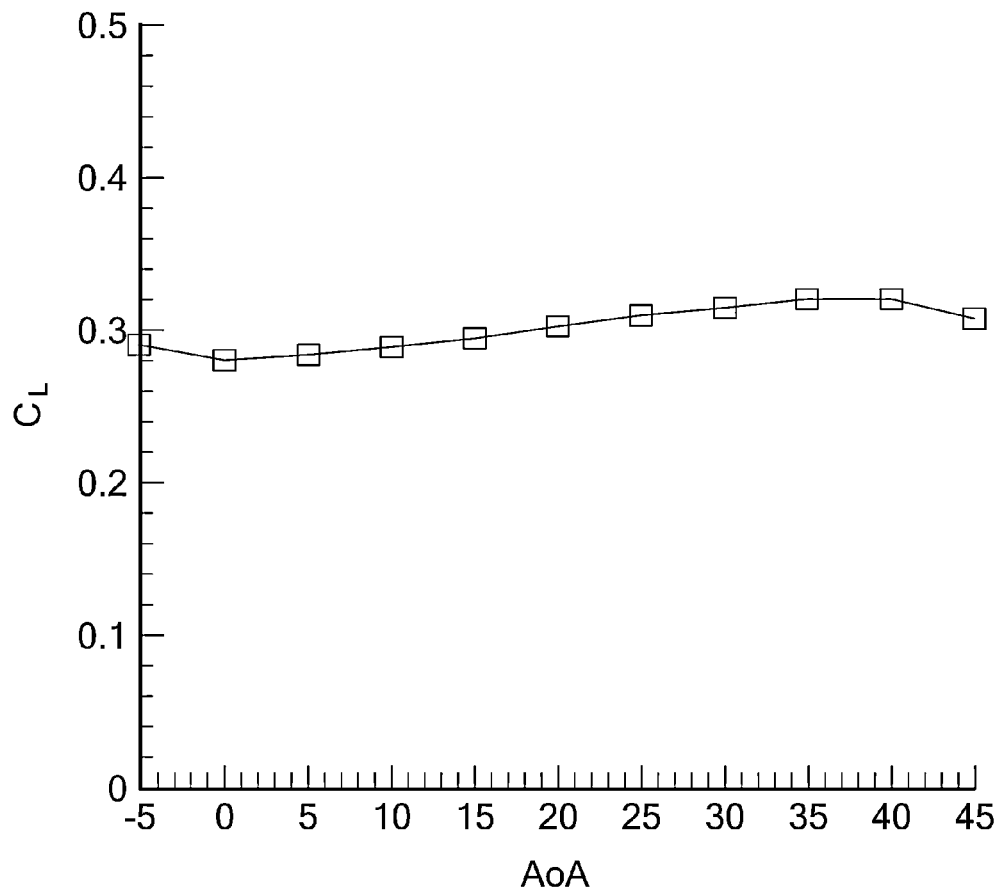
FIG. 14 is a graphical illustration of the momentum coefficient $C\mu$ versus angle of attack for an embodiment of an aircraft in accordance with the present invention.

These computations show that flow separates at a very high angle of attack, about 35° as seen in FIGS. 10 and 11. As can be seen in FIG. 12, the 3-D drag coefficient remains negative within a range of angles of attack of about −5° to 5°. After this point, the form drag is large enough to offset the thrust produced by the CFJ airfoil. As can be seen from FIG. 13, the pressure drag is greatest in the leading edge of the aircraft (red areas), near the flow stagnation point. This form drag increases with angle of attack as the profile area presented to the incoming flow becomes larger. This result is slightly lower than the 2-D case, but even when the $C_D$ becomes positive, it is still significantly lower than that of the baseline case. The $C_D$ will probably be even lower and remain negative at a higher angle of attack for configurations with a higher aspect ratio, due to the decrease in induced drag from wing-tip vortices, which is a significant source of drag. The momentum coefficient Cμ remains relatively constant throughout a range of angles of attack, as can be seem from FIG. 14.

Figure 15:
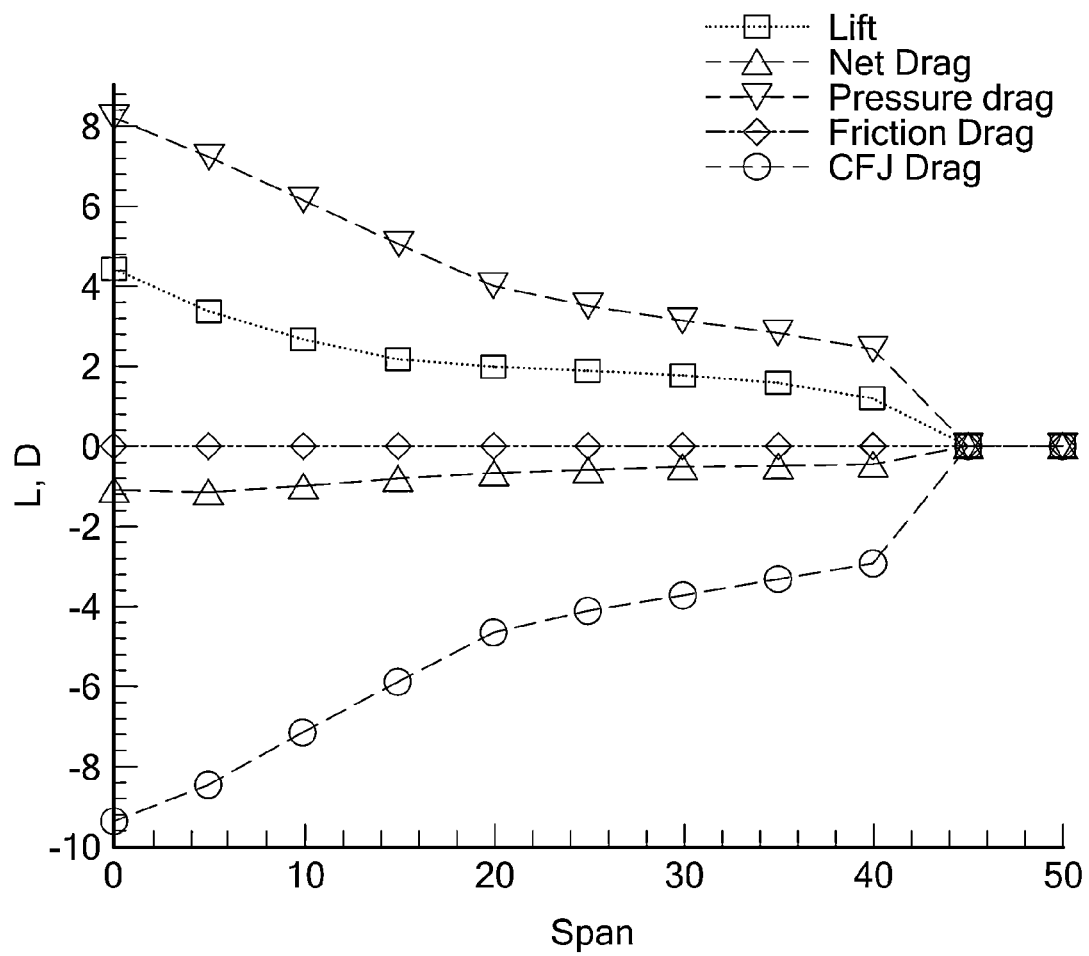
FIG. 15 is a graphical illustration of the lift and drag profile at an angle of attack equal to 0° along a wing span of an embodiment of an aircraft in accordance with the present invention.
Figure 16:
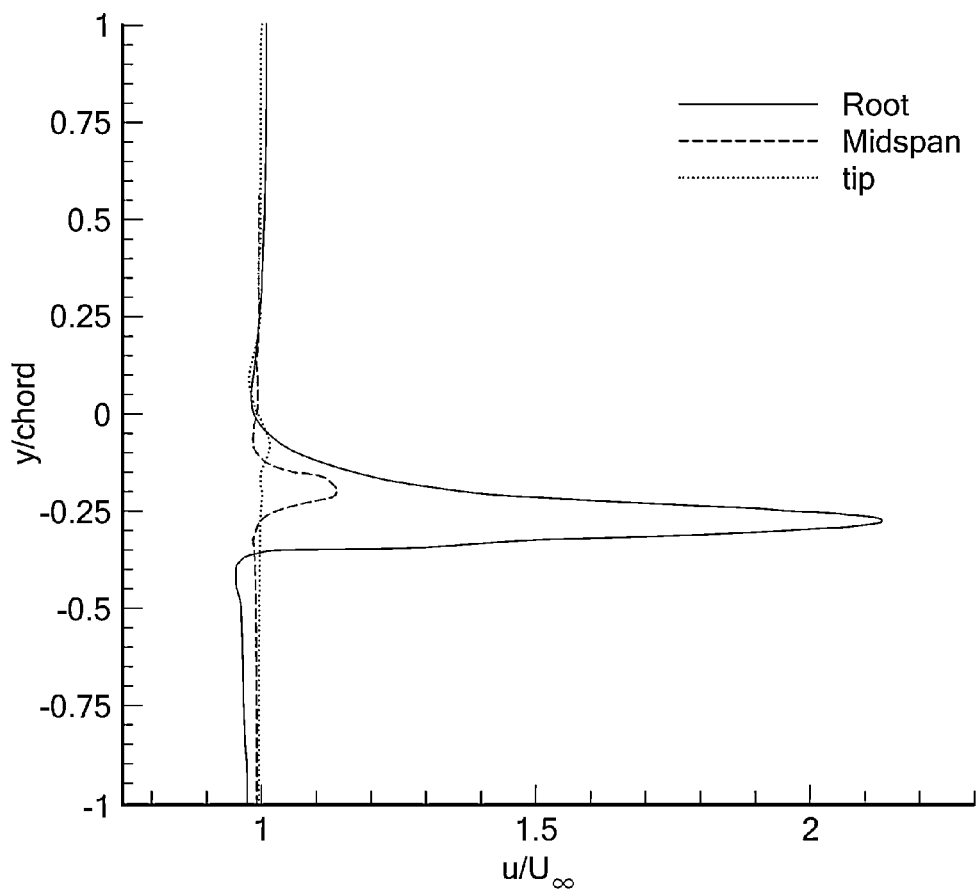
FIG. 16 is a graphical illustration of a three-dimensional wake profile plot for an embodiment of an aircraft having an angle of attack equal to 0° in accordance with the present invention.
Figure 17:
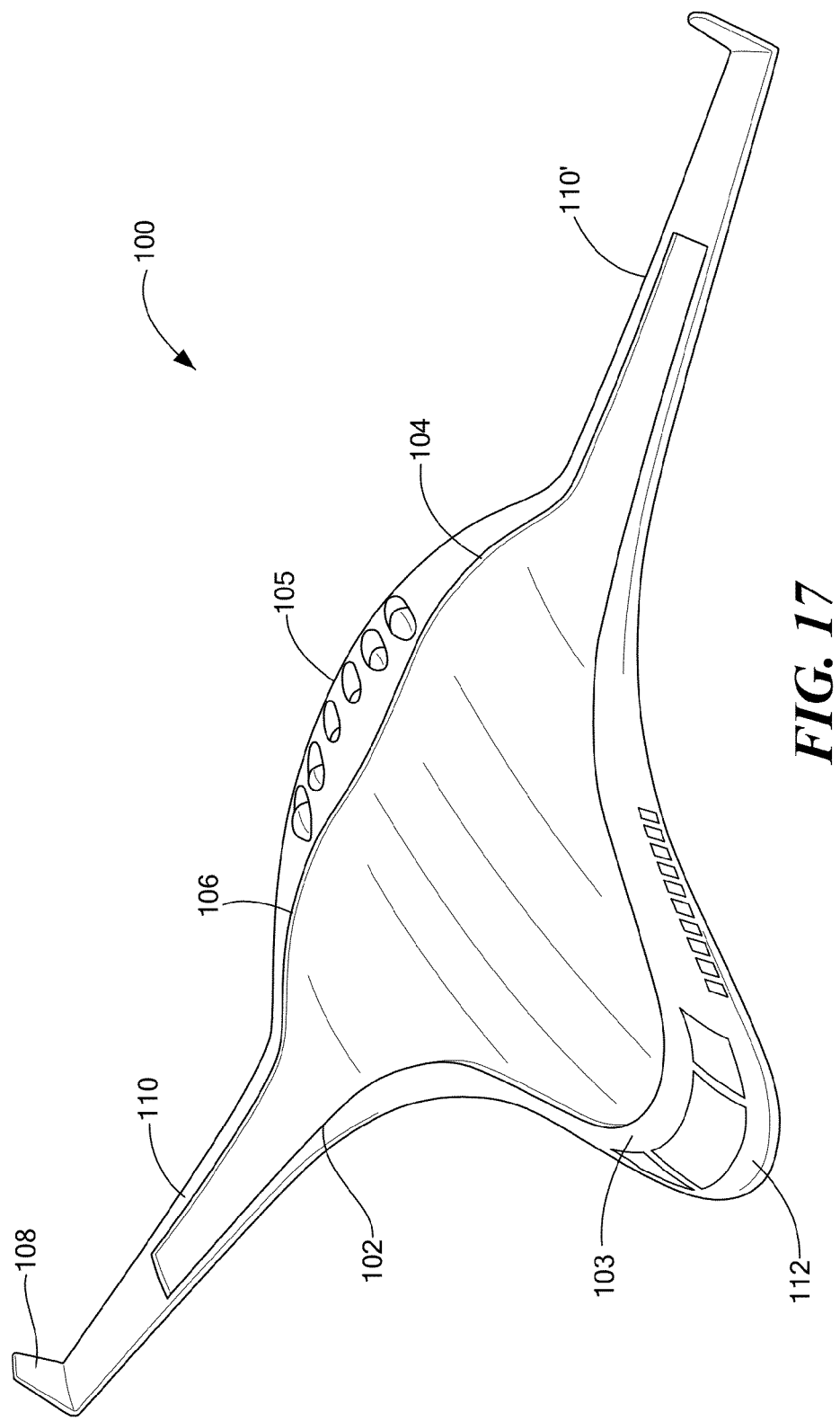
FIG. 17 is a perspective view of an embodiment of an aircraft constructed in accordance with the principles of the present invention.
Figure 18:
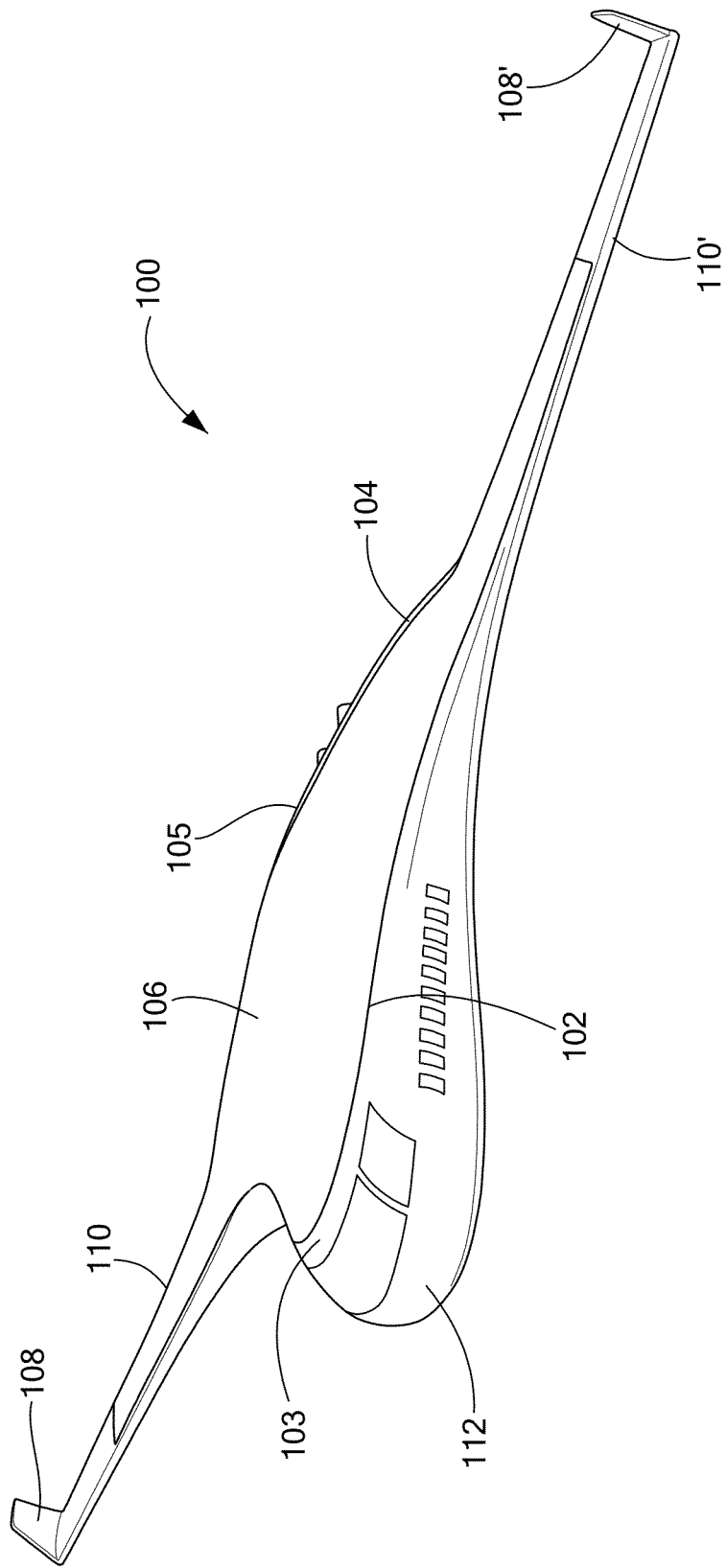
FIG. 18 is another perspective view of an embodiment of an aircraft constructed in accordance with the principles of the present invention.
Figure 19:
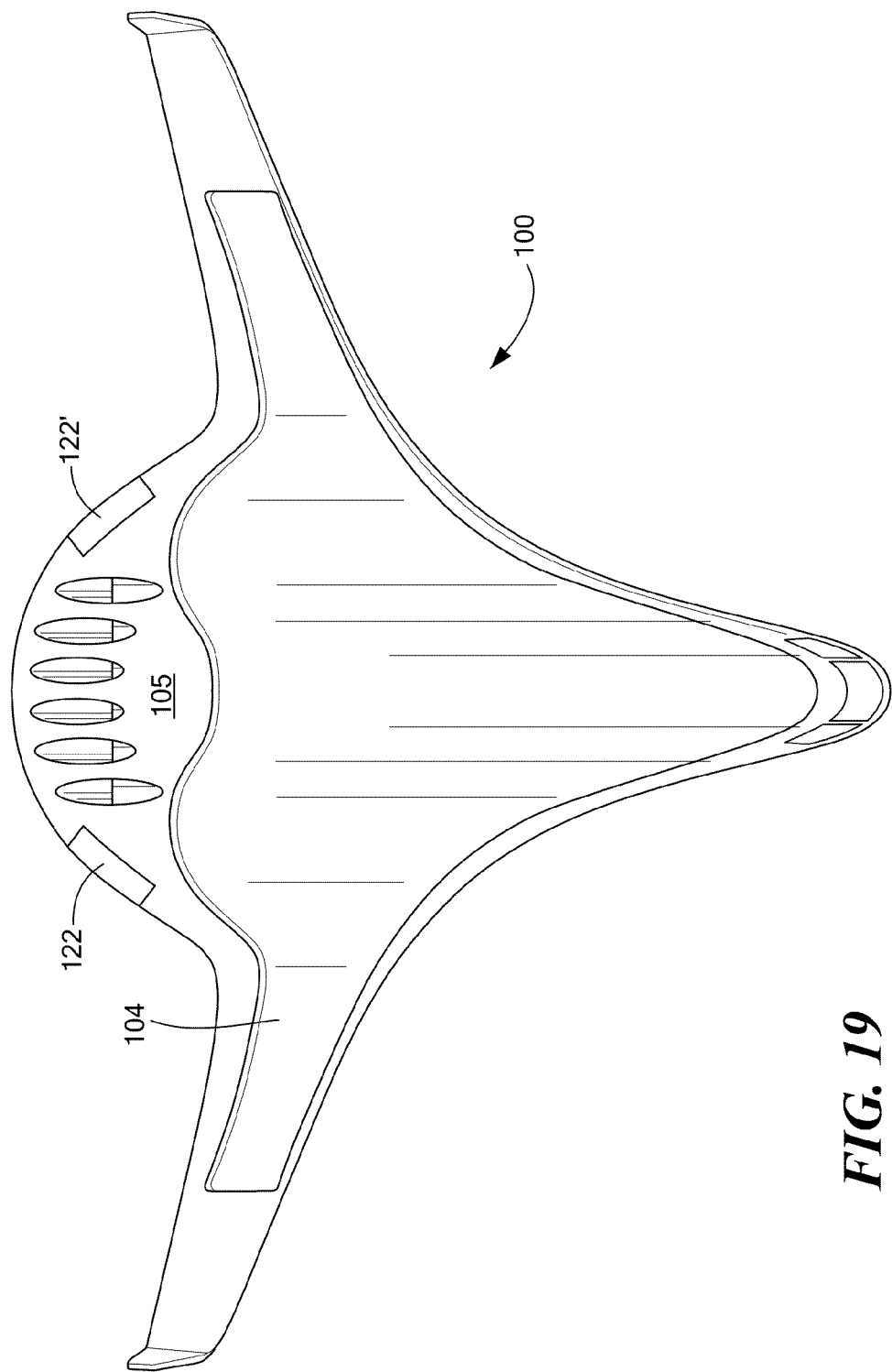
FIG. 19 is a top view of an embodiment of an aircraft constructed in accordance with the principles of the present invention.
Figure 20:
FIG. 20 is a side view of an embodiment of an aircraft constructed in accordance with the principles of the present invention.
Figure 21:
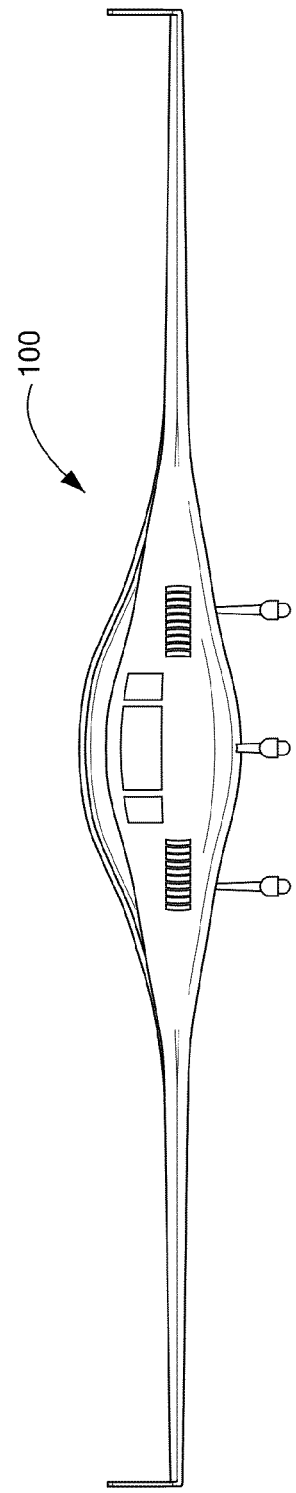
FIG. 21 is a front view of an embodiment of an aircraft constructed in accordance with the principles of the present invention.
Figure 22:
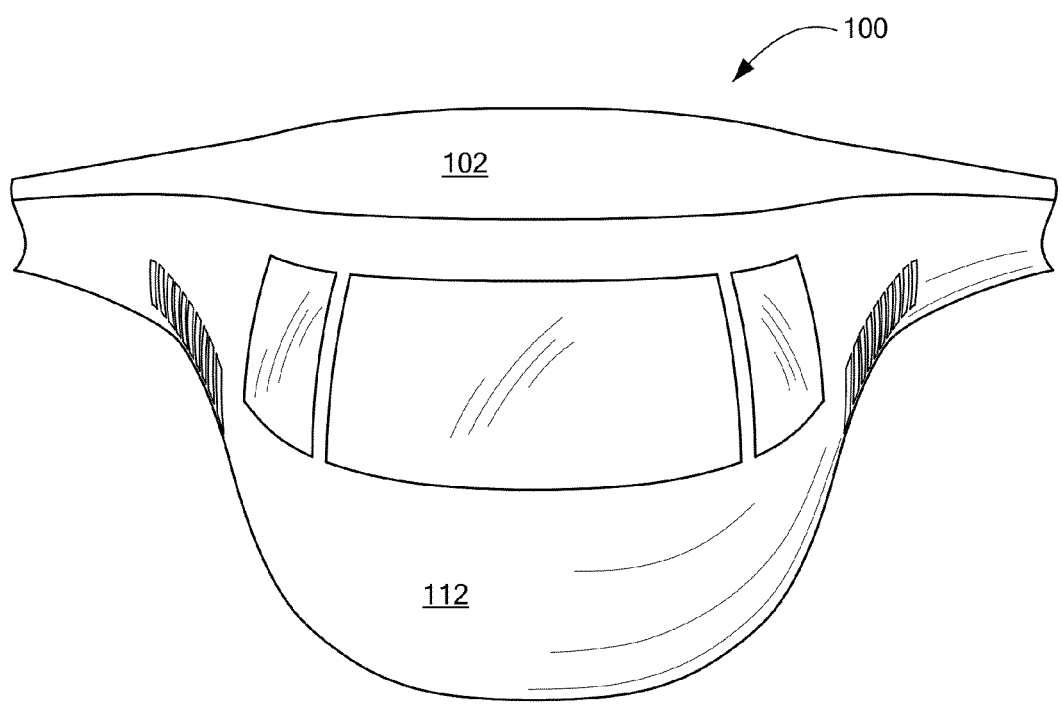
FIG. 22 is an additional front view of an embodiment of an aircraft constructed in accordance with the principles of the present invention.

Wake profile plots for the aircraft at different sections along the wing show that the drag is more highly negative at the root of the aircraft, and becomes positive towards the wingtips, where induced drag becomes significant. This can be seen from FIG. 15. However, when averaged over the wingspan, the net drag is negative at low angles of attack. Normally, the wake of a wing features flow that is slower than in surrounding areas. However, the CFJ wake is particular in that the flow there is dramatically faster than in surrounding areas, as can see from FIG. 16. As mentioned before, this type of wake profile will lead to a net thrust being produced.

Now referring to FIGS. 17-22, an aircraft 100 constructed in accordance with the principles of the present invention is illustrated. In particular, aircraft 100 may have an injection slot 102 proximate a leading edge 103 of the aircraft 100, and a recovery slot 104 near the trailing edge 105 of the aircraft 100 such that a co-flow jet or stream of fluid is circulated across a substantial portion of a surface of the aircraft. The aircraft 100 defines an upper surface 106, where the upper surface 106 may include a first portion and a second portion. The second portion may be recessed with respect to the first portion, and the second portion may comprise a substantial amount of the surface area of the upper surface. For example, the recessed portion may extend from a location proximate or otherwise close to a first wing tip 108 of the aircraft 100 to a location proximate a wing tip 108' on the opposite side of the aircraft. As discussed above, by providing a CFJ across an increased surface area of the aircraft 100, the aircraft thus has reduced output requirements for a propeller or jet engine system because the CFJ airfoil/fuselage of the aircraft 100 itself is capable of generating thrust.

Continuing to refer to FIGS. 17-22, the aircraft 100 of the present invention may include a configuration to enable a fluid jet to flow across almost the entire upper aircraft surface to achieve the maximum benefit, resulting in the generation of lift and thrust wherever it is applied. In particular, the aircraft 100 may generally include a pair of wings 110, 110' positioned towards the rear or trailing edge 105 of the aircraft. An elongated, curved forward nose portion 112 may extend from the general aircraft body, and a pronounced, curved tail portion 114 may also constitute a component of the aircraft 100. The aircraft 100 generally includes an airframe where the fuselage and wings are incorporated into a single, blended body. This is typically called a flying wing configuration, because the entire aircraft effectively acts as a wing. Because the fuselage may have a similar airfoil cross section as the wings, it acts as an extension of the same and thus produces additional lift. This particular embodiment also allows for an increased coverage area for the CFJ mechanism, therefore increasing the benefits gained from using it. A flying wing design further allows for a reduction in the wingspan of the aircraft. As the fuselage surface generates lift, the aircraft can produce increased lift with a shorter wingspan.

Figure 23:
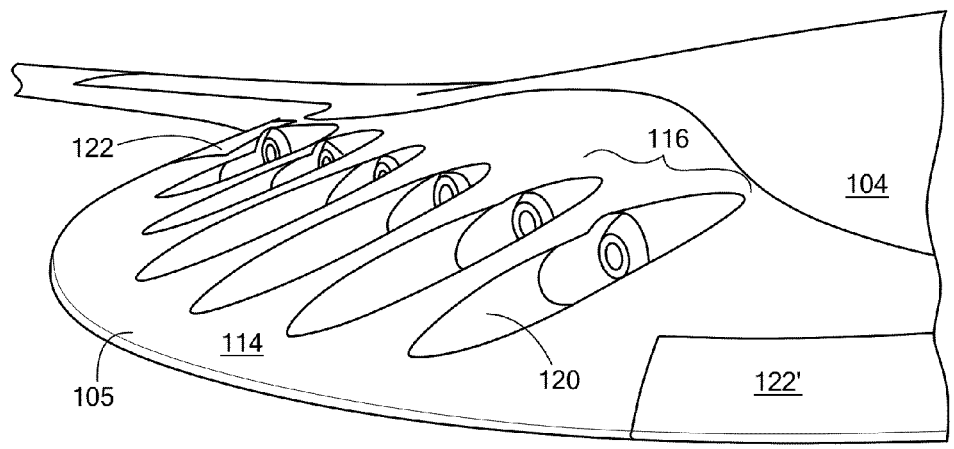
FIG. 23 is a rear perspective view of an embodiment of an aircraft constructed in accordance with the principles of the present invention.
Figure 24:
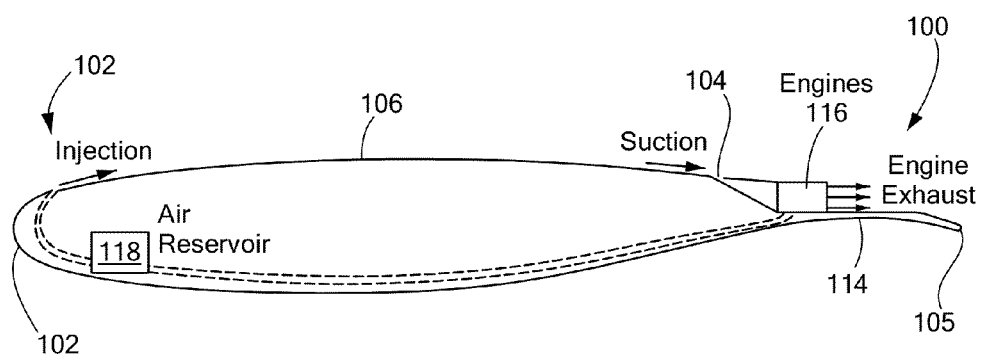
FIG. 24 is a cross-sectional schematic of an embodiment of an aircraft constructed in accordance with the principles of the present invention.

Now referring to FIGS. 23-24, the airplane 100 may include a pumping system and/or thrust components to draw the jet mass flow near the trailing edge and inject the jet near the leading edge. For example, one or more engines, turbofans and/or thrust-generation components 116 may be included on a rear portion of the aircraft 100. The engines may include air intake portions, compressor stages or portions, combustion stages, and an exhaust which may be situated or otherwise positioned within a portion of the aircraft body. The engines 116 may be located in between the recovery slot 104 and the trailing edge 105 of the aircraft 100. As such, the engines 116 may receive air or fluid intake directly from the recovery slot 104 for subsequent combustion for thrust generation. In addition, while part of the fluid flowing into the recovery slot 104 is directed towards the engines, a portion may be recirculated or otherwise directed to a reservoir and/or pump 118 for injection through the injection slot 102 to provide the CFJ operation. A fluid path 119 may provide fluid communication and/or a route for pressurized fluid to flow from the recovery opening 104 and/or the one or more engines 118 to the injection opening 102.

Referring to FIG. 23 in particular, the engines may be 'buried' or otherwise recessed or integrated into a portion of the aircraft body to reduce noise radiation, provide improved aerodynamic characteristics, reduce heat signature, and mask turbofan blades from radar. In particular, the engines may be mounted within a top surface of the aircraft on the curved tail portion 114, where the curved tail portion 114 defines a contoured, cylindrical surface or depression 120 complementary and adjacent to the exhaust portion of each of the one or more engines 116. Such a configuration can funnel or otherwise direct the exhaust gases towards the trailing edge of the plane without disturbing the fluid flow across the upper surface of the aircraft, and further causes most of the engine jet noise to propagate up away from the ground, which greatly reduces the noise footprint of the aircraft 100 during takeoff and landing.

A conventional aircraft design has protruding engine nacelles that contribute to the total drag. In the present aircraft 100, with the engines buried deep in the aft or tail section, drag is greatly reduced. Also, although the high-temperature exhaust from the engines is close to the trailing edge of the aircraft, the structure of the aircraft is substantially protected from potentially damaging temperatures from cooling bypass air exiting the engines to form an encompassing cylinder of cooling air around the hotter exhaust gases. This also greatly reduces the IR signature of the aircraft.

Furthermore, the suction of the intake and the exhaust jets of the buried engines in the rear part of the airplane enhance the overall circulation of the flying wing configuration of aircraft 100 and energize the boundary layer. The recovery slot 104, which is also the engine intake, may run across approximately 80% or more of the entire wingspan. In addition, the slots may be perpendicular to the local airfoil surface to enhance fluid flow and recovery. In a particular example, the injection slot 102 may include a height of between approximately 0.15% to 0.55% of the mean aerodynamic chord and may be placed between approximately the 2.5% to 8% chord point on the top surface of the airfoil. The recovery slot 104 may be positioned between approximately the 65% to 90% chord point, and have a height of between approximately 0.25% and 1% of the mean aerodynamic chord. The angle for the injection slot may also be between −10 to −20 degrees, while the recovery slot 104 may be between approximately 4 and 10 degrees when measured clockwise from the vertical.

As one or more engines may be located on either side of an aircraft centerline, asymmetric thrust from the engines could potentially cause the aircraft to yaw. To compensate, the aircraft 100 may further include a split elevator (or elevon pair) 122, 122' located behind the engines that will cause the pitching moments and rolling about the longitudinal axis of the airplane. The aircraft 100 may further include a control system (not shown) that employs feedback from the propulsion components to control the amount of yaw needed to return the aircraft 100 to coordinated flight at any instant while also allowing a constant lift force from the CFJ.

Since the CFJ of the aircraft 100 can generate very high lift, the flap and slat systems found in conventional aircraft may be omitted. Without the conventional high lift system, noise during takeoff and landing will be significantly reduced, and moreover, the number of moving parts may be significantly reduced, thereby reducing the overall complexity of the aircraft and reducing the likelihood of mechanical failure and the like. Since the mixing effect occurs on the upper surface of the airplane, noise produced by the CFJ will radiate upward. Moreover, a reduced stall speed causes a further decrease in the noise produced from the wake over the aircraft at takeoff and landing.

As discussed above, typical combustion engines are typically very inefficient and have a very large thermal energy (total enthalpy) loss of 50% or more. A CFJ system draws the air flow on the suction surface of the wing and/or fuselage near the trailing edge, pressurizes the air within the wing and then exhausts the same air near the wing leading edge. Such a process has a direct interaction with the wing and enhances the wing lift by inducing a large circulation and generates a thrust at the same time.

Use of the CFJ system across at least a portion of an aircraft may significantly reduce energy expenditure. In short, the power required for the aircraft 100 is significantly less than that of a conventional airplane. The ultimate efficiency of an aircraft is determined by the ratio of lift to drag. When a part of the power is consumed to generate the CFJ and enhance lift, it will also reduce the drag, or produce thrust at a low angle of attack. For a conventional airplane, the power system is used only to overcome the drag and has no interaction with the airframe system to enhance lift. The equivalent L/D of the CFJ airplane 100, hence, will be significantly higher than that of the conventional airplane. Since the lift coefficient of the CFJ airfoil element is higher than the conventional airfoil, the overall lifting surface area to have the same payload will thus be smaller. The weight of the airplane and the drag due to the wetted surface will be also significantly reduced. With the buried aircraft engines, the drag due to the engine nacelles will also be removed. As a result, the reduced weight and drag will further reduce the energy consumption.

The power consumed by the CFJ pump alone is:

$$P_{pump} = \frac{\dot{m} C_p T_{o1}}{\eta}\left(\left[\frac{p_{o1}}{p_{o2}}\right]^{\frac{\gamma-1}{\gamma}} - 1\right)$$

Where, $\dot{m}$ is the CFJ mass flow rate, and; $T_o$ and $p_o$ are the total temperature and total pressure, respectively. $C_p$ is the specific heat capacity at constant pressure, $\gamma$ is the ratio of specific heats (taken to be 1.4), and $\eta$ is the pump efficiency. Based on the above equation, the power required to pump or otherwise circulate the jet or fluid stream of the CFJ is dependent on the ratio of the total pressure at the injection and suction and the mass flow rate of the jet. The CFJ mass flow rate is usually significantly smaller than the engine mass flow rate. The total pressure ratio is also small. For a cruising example, the CFJ mass flow rate is 9.7% of the engine mass flow rate. At takeoff, the CFJ mass flow rate may be approximately 16.9% of the engine flow rate. Hence, the overall power required to pump CFJ, and thus operated the aircraft 100, is small.

To consider the energy consumption due to the pumping power, an equivalent drag term may be defined that is the summation of the power required to overcome the drag and the CFJ pumping power divided by the flight velocity as the following:

$$D_{eq} = \frac{D V_\infty + P_{pump}}{V_\infty}$$

The equivalent drag is used to determine QUEIA's L/D for aerodynamic efficiency, which is critical to determine the range and endurance. In this exemplary design, the total pressure ratio was taken as 1.1 and the efficiency is taken as 80%. The equivalent lift-to-drag ratio obtained for aircraft 100 is thus 39.4. Such a high L/D results in low energy expenditure and extended operating range.

The takeoff/landing distances and the stall velocity are primarily determined by the maximum lift coefficient. The stall velocity of aircraft 100 is significantly lower than a conventional airplane due to the very high maximum lift coefficient. Consequently, QUEIA will display short takeoff and landing ("STOL") performance. The decreased stall velocity will reduce runway distance use, and hence increase the airport capacity. In addition, at different phases of the flight mission, the lift and thrust can be controlled by adjusting the jet strength. For example, during takeoff, a stronger jet may be used to generate high thrust and high lift, while at cruising speed, a weaker jet may be used due to lower lift coefficient and the amount of thrust required to remain in flight. Upon landing, the jet velocity and/or mass may be adjusted to allow the aircraft to fly at high angle of attack with high lift and high drag.

A significant reduction in noise emission may be achieved through the takeoff and landing performance alone. The steep climb and descent angles of 8 and −12 degrees that the aerodynamic performance of the CFJ permits ensures that the aircraft climbs more efficiently, or travels higher for a given horizontal distance. Also, when the aircraft 100 descends for landing, the descent may begin closer to the airport to reduce the noise footprint on the airport's surroundings. The gliding performance rendered by the extremely large L/D value also allows descents with minimum power settings that are very efficient and silent Overall, the present invention provides an advanced aircraft system that tightly integrates the airframe, Co-Flow Jet flow control airfoil, and engines. These features allow an increased capacity of congested airports. The CFJ blended wing system hence will deliver superior energy efficiency and favorable impacts to environment as described.

Figure 25:
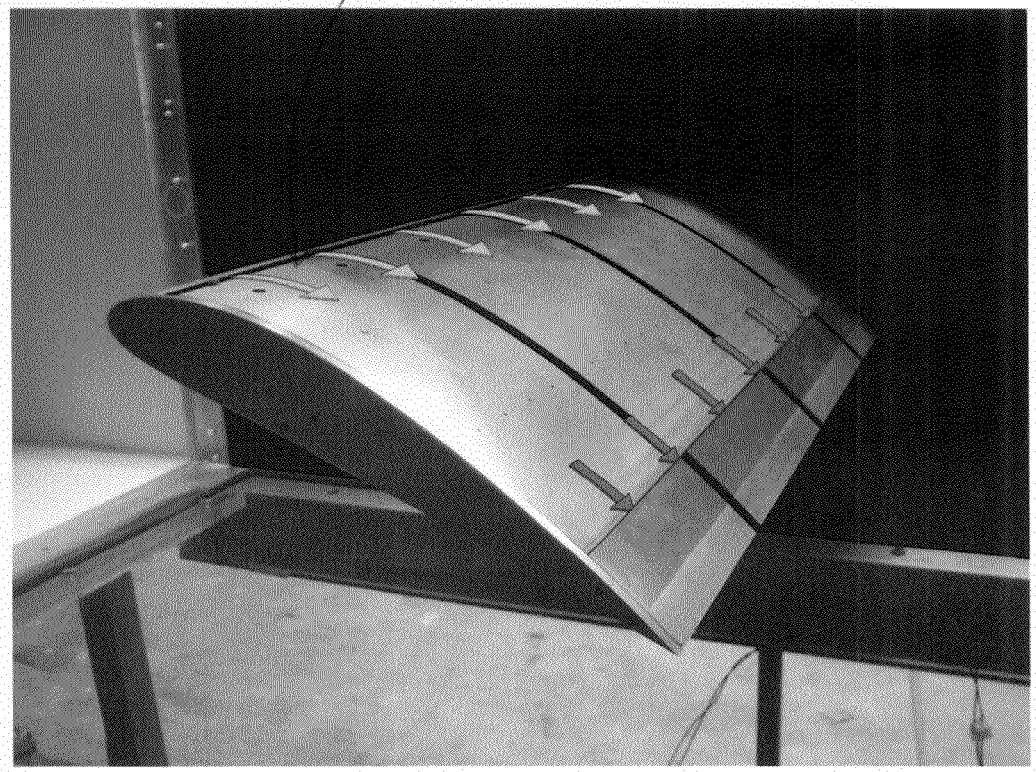
FIG. 25 is a perspective view of an embodiment of an aircraft constructed in constructed in accordance with the principles of the present invention.
Figure 26:
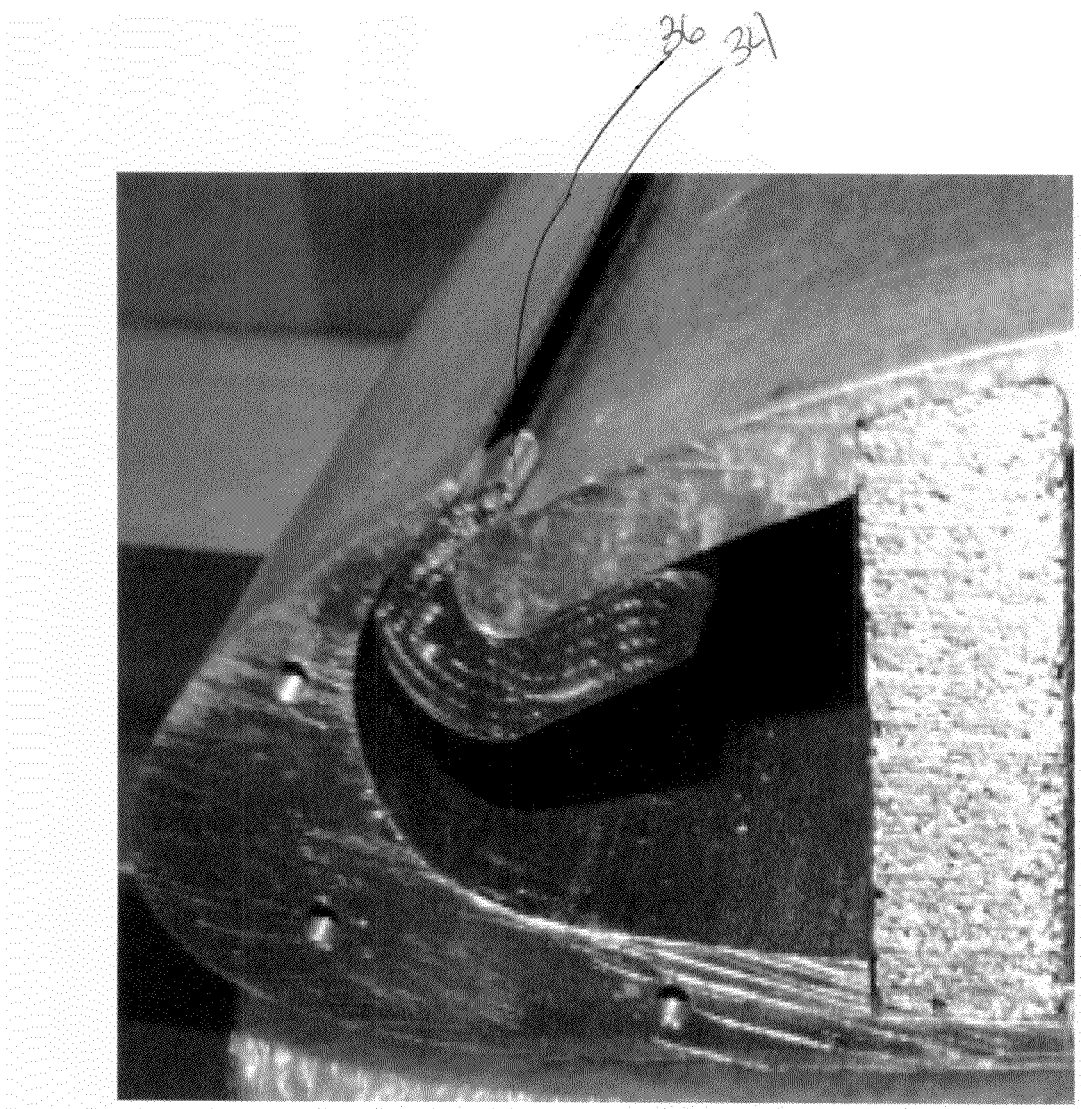
FIG. 26 is a side perspective view of the engagement of the tabs with the aircraft shown in FIG. 25.
Figure 27:
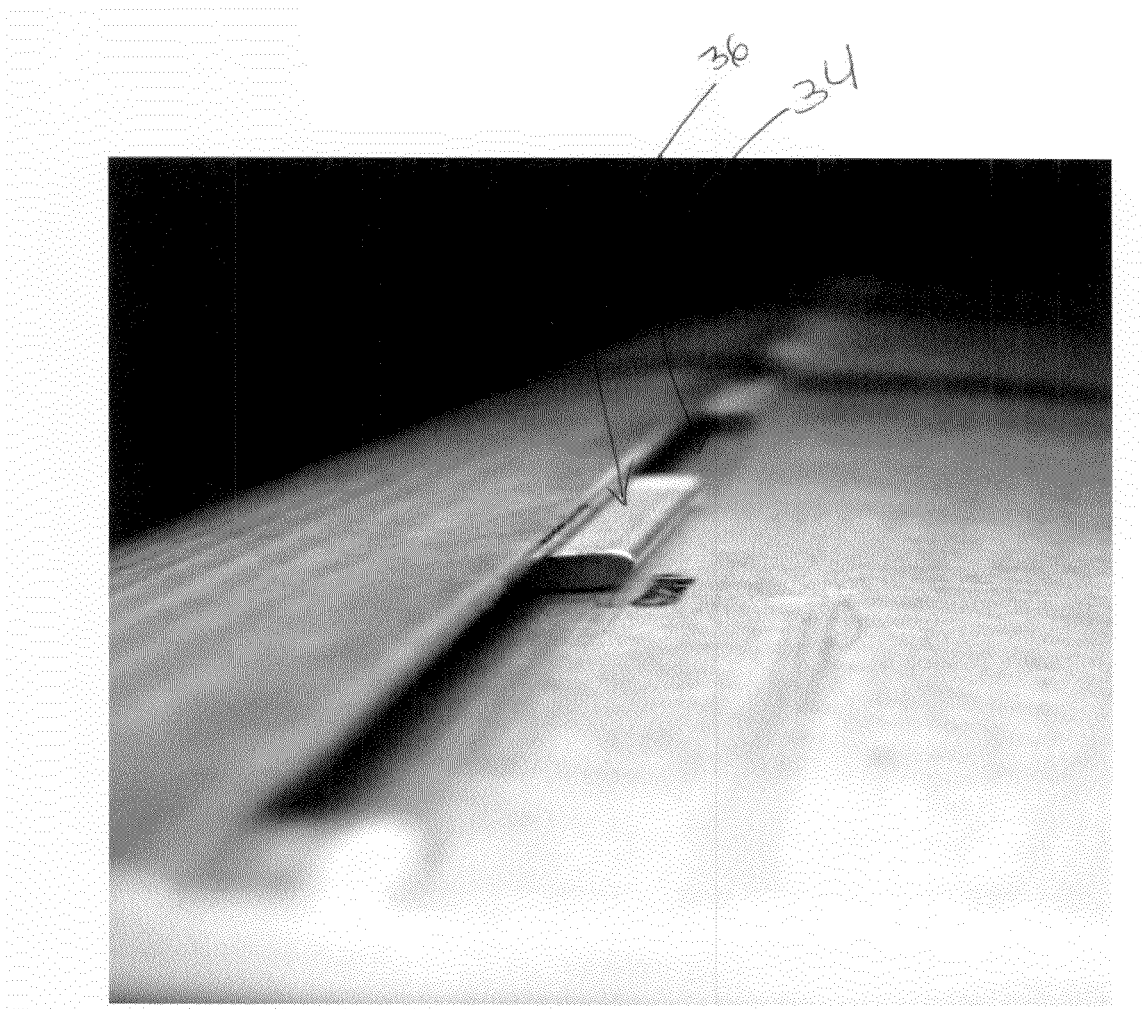
FIG. 27 is a top perspective view of the aircraft shown in FIG. 25.

Now referring to FIG. 25, in another configuration, fluid may be dispensed from a plurality of injection openings 34 along the span of the aircraft and recovered by one or more recovery openings 24 also positioned along the span of the aerodynamic structure 10. Moreover, the injection and recovery openings may only span a portion of the aerodynamic structure, rather than the entire length. For example, the injection opening 22 may be partially obstructed to achieve various jet sizes and various lift profiles. In particular, a plurality of tabs or flaps 36 may be included on the aerodynamic structure 10 proximate the injection opening 22 to define the plurality of injection openings 34. The tabs 36 may be the same material as the aerodynamic structure 10 or airfoil, for example, steel or another alloy and may be any shape or size. In an exemplary configuration, the tabs 36 have a substantially rounded or ovular cross-section to provide for improved airflow and are sized to obstruct a portion of the length of the injection opening 22. Each tab 36 may be substantially U-shaped such that the recessed portion of the "U" may engage and fit with the top portion of the aerodynamic structure as shown in FIG. 26. The tabs 36 may further be welded or otherwise anchored to the aerodynamic structure. In a particular configuration as shown in FIG. 2, the tabs 36 are spaced along the span of the airfoil. A jet is formed between two adjacent tabs 36 and airflow is blocked by the tabs 36 as each tab 36 is positioned to occlude a portion of the injection opening 24.

The arrangement and size of the tabs 36 may be variable depending on the desired lift and thrust. For example, the table in Table 3 shows exemplary arrangements of tabs 36 along the length of the injection opening 22. Different sizes and arrangements of tabs 36 are organized by respective obstruction factors (OF). The OF is defined as the obstructed area divided by the area of the unobstructed injection opening 22. Based on Newtonian fluid flow, for a given mass flow rate, increasing the OF will result in an increase in fluid flow velocity through the plurality of openings 34 owing to decreased flow area. As a result, depending on the OF, the number of openings 34, and the Angle of Attack (AoA), certain lift profiles may be achieved.

For example, in an exemplary configuration to test the various tabs 36 configurations, the range of AoA was varied between 0° to 35°. Nominal free stream velocity was $V_\infty=10$ m/s for all tests and the chord Reynolds number was about 195,000. The jet momentum coefficient $C\mu$ was defined as $$C_\mu = \frac{\dot{m} V_{jet}}{\frac{1}{2} \rho_\infty V_\infty^2 S}$$

where $\dot{m}$ is the jet mass flow rate, $V_{jet}$ is the jet velocity, $\rho_\infty$ is the free stream density, $V_\infty$ is the free stream velocity, and S is the planform area of the airfoil. $C\mu$ changes when OF is changed even if this kept constant. For comparison purposes, the jet momentum coefficient for the open slot airfoil or CFJ (FIG. 1) described above was used and defined as:

$$C_\mu^* = \frac{\dot{m} V_{jet}^*}{\frac{1}{2} \rho_\infty V_\infty^2 S}$$

where the superscript * stand for open slot airfoil described.

For a given OF, a large number of configurations can be obtained depending on the number of jet injection openings 34 and the opening sizes. Table 3 shows the list of the OF presented here, ranging from ⅕ to ¾, and the opening sizes. For each OF, two configurations were tested containing the larger (hereafter labeled A) and smaller number of discrete tabs 36 (hereafter labeled B). Mass flow rates of $\dot{m}=0$ kg/s, 0.030 kg/s, 0.045 kg/s and 0.060 kg/s are used. Corresponding open slot airfoil momentum coefficients are $C\mu^*=0, 0.08, 0.16$ and $0.30$, respectively. Table 4 shows the values of $C\mu$ and $C_\mu^*$ and the corresponding jet exit velocity for all configurations having a plurality of injection openings 34. The following drag reduction efficiency parameter is defined as:

$$\eta = \frac{C_{D_{baseline}} - C_{D_{DCFJ}}}{C_\mu}.$$

This quantity describes the efficiency of drag reduction at the energy cost to pump the jet with the momentum coefficient of $C\mu$. In other words, it is a measure of how much injection jet momentum is absorbed as the drag reduction.

TABLE 3

Matrix of discrete CFJ configuration

| Name | OF | Config | # of jets | Hole width mm (% cord) | Schematic representation (openings are injection holes, solid lines are tabs) |
|---|---|---|---|---|---|
| DCFJ 1/5 | 1/5 | A | 5 | 94.5 (16.0%) | |
| | | B | 2 | 236.2 (40.0%) | |
| DCFJ 1/3 | 1/3 | A | 10 | 43.7 (7.4%) | |
| | | B | 5 | 98.4 (16.7%) | |

TABLE 3-continued

Matrix of discrete CFJ configuration

| Name | OF | Config | # of jets | Hole width mm (% cord) | Schematic representation (openings are injection holes, solid lines are tabs) |
|---|---|---|---|---|---|
| DCFJ 1/2 | 1/2 | A | 19 | 15.5 (2.6%) |  |
|  |  | B | 3 | 98.4 (16.7%) | 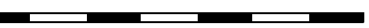 |
| DCFJ 2/3 | 2/3 | A | 19 | 10.4 (1.76%) |  |
|  |  | B | 9 | 21.9 (3.7%) |  |
| DCFJ 3/4 | 3/4 | A | 14 | 10.5 (1.79%) |  |
|  |  | B | 5 | 29.5 (5.0%) |  |

TABLE 4

Corresponding Cμ and $C_\mu^*$ for discrete CFJ configurations

| | | Cμ and $V_{jet}$ (Discrete CFJ) | | | | |
|---|---|---|---|---|---|---|
| $\dot{m}$ (kg/s) | $C_\mu^*$ and $V_{jet}$ (Open Slot) | DCFJ 1/5 | DCFJ 1/3 | DCFJ 1/2 | DCFJ 2/3 | DCFJ 3/4 |
| 0.030 | 0.08 (25 m/s) | 0.11 (29 m/s) | 0.13 (38 m/s) | 0.17 (52 m/s) | 0.23 (73 m/s) | 0.34 (106 m/s) |
| 0.045 | 0.16 (33 m/s) | 0.21 (43 m/s) | 0.23 (51 m/s) | 0.30 (69 m/s) | 0.49 (109 m/s) | 0.67 (153 m/s) |
| 0.060 | 0.30 (46 m/s) | 0.36 (56 m/s) | 0.41 (69 m/s) | 0.58 (97 m/s) | 0.89 (150 m/s) | 1.32 (231 m/s) |

As explained below, "DCFJ" stands for discrete co-flow jet, which includes configurations with a plurality of tabs 36 creating the plurality of injection openings 34. The configurations with higher number of injection openings 34 (A) systematically generate more lift than the alternate configurations (B). This is because configuration A with smaller injection openings 34 generates higher jet velocity, higher entrainment, stronger jet mixing, and thus higher circulation. This trend increases as the value of $C_\mu^*$ is increased. Overall, a lift increase between 10% and 40% over the open slot airfoil can be obtained using configuration A instead of B. For increased OF, the difference between the two configurations seems to decrease with increasing AoA. These results suggest that smaller sized injection openings 34 with higher jet velocity are more effective to enhance lift.

Compared to open slot airfoils, DCFJ 1/5 (meaning 1/5 of the injection opening 22 is obstructed) and DCFJ 1/3 show a small decrease in lift for all $C_\mu^*$ and all AoA except past the stall angle (AoA≅25°). For DCFJ 1/2, a clear increase in lift can be observed for all AoA. This trend increases for increasing values of $C_\mu^*$. Finally, DCFJ 2/3 and DCFJ 3/4 show a substantial lift increase over the open slot CFJ for all AoA and all $C_\mu^*$.

Evaluation of the lift performance increase for DCFJs compared to baseline and open slot CFJ are shown in Fig. Increasing $C_\mu^*$ and OF systematically provides an increase in lift. The difference between DCFJ 2/3 and DCFJ 3/4 is not obvious and that, for lift enhancement, they appear approximately equivalent. Compared to the open slot CFJ, the DCFJs shows improvement for OF higher than 1/2. While DCFJ 1/2 show only a 10% increase in lift, DCFJ 2/3 and DCFJ 3/4 show a 30% to 50% increase. These results are considerable considering the magnitude of lift achievable and the energy expenditure of the CFJ pump. For example, using the DCFJ 2/3 at $C_\mu^*$=0.08 provides comparable lift coefficient with the open slot CFJ that needs twice the flow rate. For open slot CFJ, the maximum lift is increased by 1.5 to 1.8 times. For DCFJ 3/4, the maximum lift is increased by 2.73 times using the same mass flow rate as the open slot CFJ airfoil.

Similarly to the lift results, DCFJ 1/5 and DCFJ 1/3 show only a small decrease in drag compared to the open slot CFJ. Negative values of drag are observed with increased range of AoA. For OF larger than 1/2, a significant drag reduction is observed for all $C_\mu^*$. A large difference between DCFJ 2/3 and DCFJ 3/4 is observed: while being comparable for lift increase, DCFJ 3/4 shows lower drag than DCFJ 2/3. Negative values of drag are observed for AoA up to 30°. DCFJs are seen to provide increased values of thrust, with up to 4 times of the thrust of the open slot CFJ airfoil. These results are significant since this negative drag/thrust component can effectively reduce the overall drag of an aircraft or helicopter rotor blade, providing a significant reduction in the engine power required to move the aircraft or rotate the rotor blades.

All DCFJ airfoils (with OF>1/2) show net lift augmentation that intensifies with increasing values of $C_\mu^*$ and grows linearly with AoA. The drag reduction is nearly constant at different AoA for a fixed $C_\mu^*$. Similar to the lift augmentation, the higher the value of $C_\mu^*$ is, the larger the drag is reduced. Open slot CFJ results range from 40% to 70%, depending on the value of $C_\mu^*$. For OF>1/2, the drag reduction efficiency is found to reach higher value, approaching 80% for all AoA and all $C_\mu$. This means that the energy cost to generate injection jet momentum not only benefits the system with a significant lift gain, but also transfers nearly 80% of jet momentum to drag reduction. Hence the overall energy expenditure is small compared to the efficiency gain measured as the ratio of lift to drag L/D.

In addition to the enhancement of lift and drag reduction, DCFJ airfoils also significantly increase stall AoA. For DCFJ ⅔ and DCFJ ¾, stall angle is approximately 30°, a 30% increase from the baseline airfoil stall angle of 23°. Higher stall AoA gives more stall margin and increases the safety of aircraft.

In summary, the configurations with higher number injection openings 34 and smaller tab 36 sizes show significantly better performance enhancement for all flow rates. Compared to an open slot CFJ airfoil using the same mass flow rate, a discrete CFJ airfoil can provide an additional 50% increase in maximum lift, 30% stall AoA increase, and 300% drag reduction. The DCFJ airfoil with more injection openings 34 and large obstruction factor, namely DCFJ ⅔ and DCF ¾, provide the greatest performance enhancement. While the lift in both cases is comparable, the DCFJ ¾ supplies an additional 10% increase in thrust compared to DCFJ ⅔. The pumping pressure ratio and power consumption are increased by reducing the injection jet size and increasing the number of openings 34. For all the tests shown here, the pumping pressure ratio remained under 1.2. The DCFJ power consumption is about 10 times higher than that for open slot CFJ, and is up to 600 W. Nearly 80% of the injection momentum is translated to drag reduction, which indicates that a CFJ airfoil is highly energy efficient.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An aerodynamic structure, comprising:
   a leading edge;
   a trailing edge;
   an injection opening proximate the leading edge having a length;
   a plurality of distinct tabs positioned within the injection opening, the plurality of distinct tabs partially obstructing the injection opening to define a plurality of injection openings;
   at least one recovery opening located between the plurality of injection openings and the trailing edge; and
   one or more engine portions positioned between the recovery opening and the trailing edge.

2. The aerodynamic structure according to claim 1, wherein the plurality of tabs are spaced evenly along the length of the injection opening.

3. The aerodynamic structure according to claim 1, the plurality of tabs including at least five tabs.

4. The aerodynamic structure according to claim 1, wherein the plurality of tabs are substantially the same size.

5. The aerodynamic structure according to claim 1, wherein half of the length of the injection opening is obstructed.

6. The aerodynamic structure according to claim 1, wherein two-thirds of the length of injection opening is obstructed.

7. The aerodynamic structure according to claim 1, wherein the aerodynamic structure defines a flying wing.

8. The aerodynamic structure according to claim 1, further comprising an equal number of the plurality of injection openings and recovery openings.

9. The aerodynamic structure according to claim 1, further comprising a wing having a span, and wherein the recovery opening extends along substantially the entire length of the span.

10. The aerodynamic structure according to claim 9, wherein the length of the injection opening is substantially equal to the length of the span.

11. The aerodynamic structure according to claim 1, wherein the one or more engine portions provide a pressurized fluid output to the injection opening.

12. An aircraft, comprising:
    an aircraft body defining a leading edge, a trailing edge, a first wing, and a second wing;
    an injection opening having a length proximate the leading edge;
    a plurality of flaps disposed proximate the injection opening, the plurality of flaps at least partially obstructing the injection opening to define a plurality of injection openings;
    at least one recovery opening located between the injection opening and the trailing edge; and
    one or more engines defining a fluid intake in fluid communication with the recovery opening.

13. The aircraft according to claim 12, wherein the plurality of flaps obstruct half the length of the injection opening.

14. The aircraft according to claim 12, wherein the plurality of flaps obstruct two-thirds of the length of the injection opening.

15. The aircraft according to claim 12, wherein the recovery opening is in fluid communication with a fluid path leading to the injection opening.

16. The aircraft according to claim 12, wherein the one or more engines provide a pressurized fluid output to the injection opening.

17. The aircraft according to claim 12, wherein the plurality of flaps includes at least five flaps.

18. The aircraft according to claim 12, further comprising an equal number of the plurality of injection openings and recovery openings.

19. An aerodynamic structure, comprising:
    a leading edge, a trailing edge, a first wing, and a second wing, each of the first and second wings defining an injection opening;
    a plurality of distinct tabs mounted within the injection openings of the first and second wings, the plurality of distinct tabs defining a plurality of injection openings spanning the length of each of the first and second wings;
    at least one recovery opening located between the plurality of injection openings and the trailing edge; and
    one or more engine portions positioned between the recovery opening and the trailing edge, the one or more engine portions in fluid communication with the plurality of injection openings and the recovery opening.

* * * * *